US011606706B2

(12) United States Patent
Fan et al.

(10) Patent No.: US 11,606,706 B2
(45) Date of Patent: Mar. 14, 2023

(54) CELL MEASUREMENT IN COMMUNICATION SYSTEMS, RELATED CONFIGURATION AND DEVICES

(71) Applicant: HUAWEI TECHNOLOGIES CO., LTD., Guangdong (CN)

(72) Inventors: Bo Fan, Chengdu (CN); Yalin Liu, Munich (DE); Shitong Yuan, Chengdu (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 160 days.

(21) Appl. No.: 16/702,956

(22) Filed: Dec. 4, 2019

(65) Prior Publication Data
US 2020/0120527 A1 Apr. 16, 2020

Related U.S. Application Data

(63) Continuation of application No. PCT/CN2018/090273, filed on Jun. 7, 2018.

(30) Foreign Application Priority Data

Jun. 16, 2017 (CN) .......................... 201710459033.6

(51) Int. Cl.
H04W 24/10 (2009.01)
H04W 76/27 (2018.01)
H04W 56/00 (2009.01)

(52) U.S. Cl.
CPC ....... *H04W 24/10* (2013.01); *H04W 56/0015* (2013.01); *H04W 76/27* (2018.02)

(58) Field of Classification Search
CPC ...................................... H04W 24/10
See application file for complete search history.

(56) References Cited

U.S. PATENT DOCUMENTS 9,942,009 B2   4/2018  Reial et al.
2012/0115495 A1*  5/2012  Rousselin ............. H04B 1/406
                                               455/450

(Continued)

FOREIGN PATENT DOCUMENTS

CN  101873646 A  10/2010
CN  103220702 A  7/2013

(Continued)

OTHER PUBLICATIONS

International Search Report for PCT/CN2018/090273, dated Aug. 29, 2018, 4 pages.

(Continued)

*Primary Examiner* — Chi H Pham
*Assistant Examiner* — Raul Rivas

(57) ABSTRACT

This application discloses a measurement method for a terminal device, including: receiving measurement configuration information; and measuring, in m measurement windows in a measurement gap based on the measurement (Continued)

configuration information, m groups of to-be-measured signals sent by a network device. Correspondingly, this application also describes a measurement configuration method, a terminal device, and a network device. According to an example implementation, the terminal device discontinuously performs measurement in the measurement windows in the measurement gap, and transmits data by using an interval between the measurement windows, to implement discontinuous measurement in the measurement gap, and further reduce a data transmission delay.

15 Claims, 11 Drawing Sheets

(56) References Cited

U.S. PATENT DOCUMENTS

| | | | |
|---|---|---|---|
| 2013/0028293 A1* | 1/2013 | Makh | H04W 48/08 455/458 |
| 2014/0171073 A1 | 6/2014 | Kim et al. | |
| 2015/0245235 A1 | 8/2015 | Tang et al. | |
| 2016/0021554 A1 | 1/2016 | Behravan et al. | |
| 2016/0212647 A1* | 7/2016 | Mo | H04W 48/16 |
| 2016/0301517 A1 | 10/2016 | Da | |
| 2016/0302098 A1 | 10/2016 | Gheorghiu et al. | |
| 2017/0048027 A1 | 2/2017 | Reial et al. | |
| 2018/0324626 A1 | 11/2018 | Zhang et al. | |

FOREIGN PATENT DOCUMENTS

| | | |
|---|---|---|
| CN | 106304124 A | 1/2017 |
| CN | 106416350 A | 2/2017 |
| WO | 2010048851 A1 | 5/2010 |
| WO | 2016/162057 A1 | 10/2016 |

OTHER PUBLICATIONS

Office Action in related Chinese Application 201710459033.6 dated Nov. 11, 2020.
3GPP TSG RAN WG1 Meeting #88bis,R1-1704334:"RRM Measurements for NR", AT&T,Spokane, USA Apr. 3-7, 2017,total 2 pages.
Ericsson:"Cell selection and reselection criteria and measurement configuration",3GPP Draft; R2-1712343,Nov. 16, 2017 (Nov. 16, 2017),XP051370967,total 4 pages.
3GPP TSG RAN WG1 Meeting #89,R1-1708445:"Discussion on NR RRM measurement based on CSI-RS for L3 mobility",NTT DOCOMO, INC.,Hangzhou, P.R. China, May 15-19, 2017,total 10 pages.
ZTE: "RRM measurements on IDLE mode RS",3GPP Draft; R1-1707050,May 14, 2017 (May 14, 2017), XP051272280, total 8 pages.
3GPP TSG RAN WG1 Meeting #88bis,R1-1705072:"Channel and interference measurement for CSI acquisition", Huawei, HiSilicon,Spokane, USA, Apr. 3-7, 2017,total 8 pages.
3GPP TSG RAN WG1 Meeting #88bis,R1-1705508:"On CSI Measurement Setting for NR", InterDigital Communications, Spokane, USA, Apr. 3-7, 2017, total 3 pages.

* cited by examiner

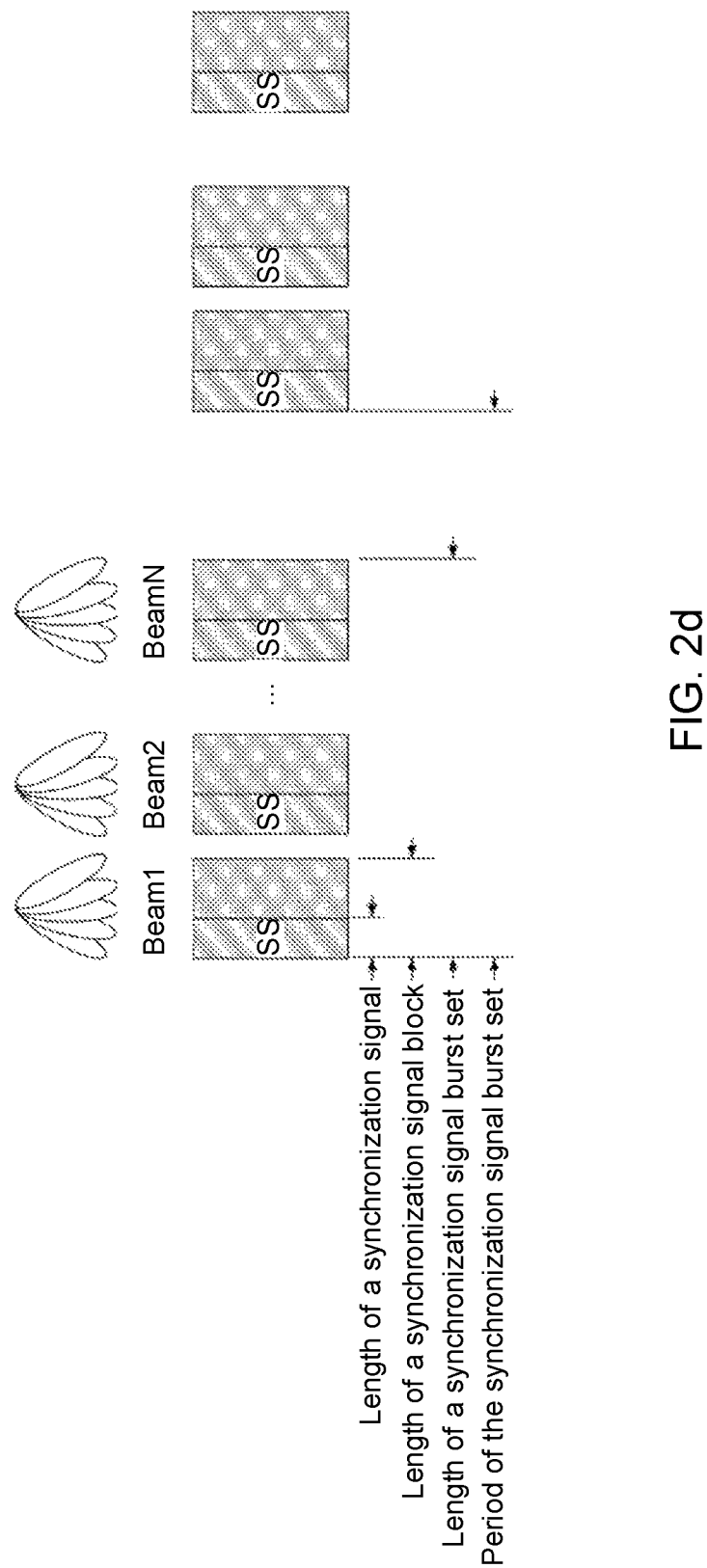

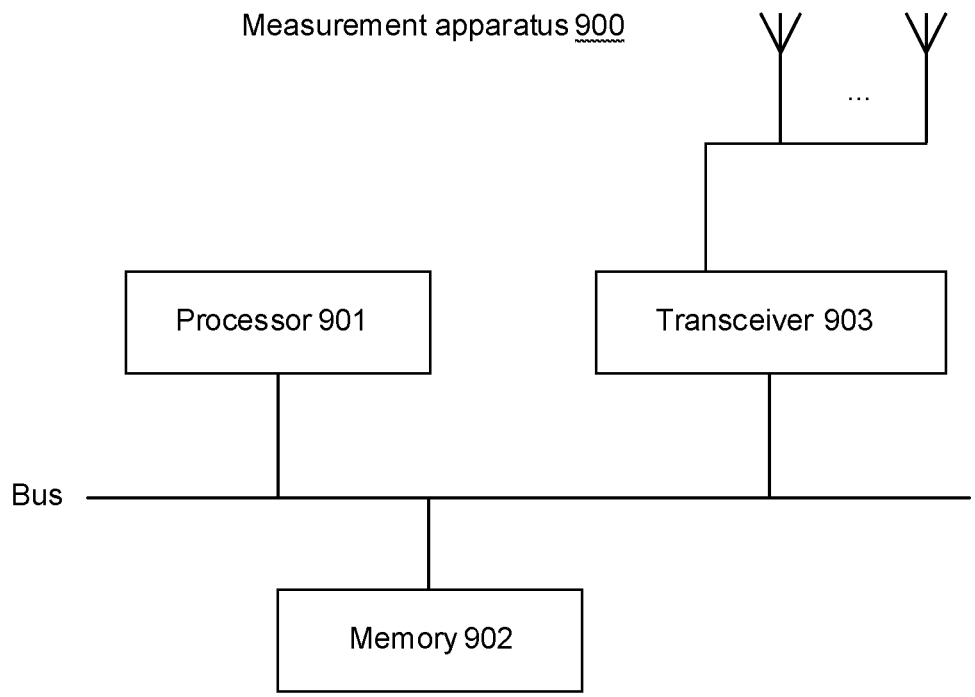

FIG. 9

S1001: A terminal device receives at least one of a period, a time offset, or a number of a synchronization signal burst set in a to-be-measured cell that are sent by a network device S1002: The terminal device determines a location of the synchronization signal burst set in the to-be-measured cell based on a period of a synchronization signal burst set in a serving cell, the period of the synchronization signal burst set in the to-be-measured cell, and the time offset S1003: The terminal device measures the to-be-measured cell based on the location of the synchronization signal burst set in the to-be-measured cell

FIG. 10a

CELL MEASUREMENT IN COMMUNICATION SYSTEMS, RELATED CONFIGURATION AND DEVICES

CROSS-REFERENCE TO RELATED APPLICATIONS

This application is a continuation of International Application No. PCT/CN2018/090273, filed on Jun. 7, 2018 which claims priority to Chinese Patent Application No. 201710459033.6, filed on Jun. 16, 2017. The disclosures of the aforementioned applications are hereby incorporated by reference in their entireties.

TECHNICAL FIELD

The present invention relates to the wireless communications field, and in particular, to cell measurement, related measurement configuration and devices.

BACKGROUND

In a Long Term Evolution (LTE) system, user equipment (UE) needs to periodically measure channel quality, in order to discover a change of the channel quality in a timely manner, and take a corresponding countermeasure. For example, when the UE finds, through measurement, that channel quality of a neighboring cell is better than that of a current serving cell, the UE is handed over to the neighboring cell whose channel quality is better. An aspect measured by the UE is a frequency of a cell. The UE may measure a specific frequency each time. The UE may measure each frequency of a communications system (for example, an LTE communications system) that currently provides a service, or may measure a frequency of another access technology (for example, a non-LTE communications system). Measurement performed by the UE on a frequency of an LTE communications system is referred to as intra-RAT measurement, and measurement performed by the UE on a frequency of another communications system is referred to as inter-RAT measurement. The intra-RAT measurement may further be classified into intra-frequency measurement and inter-frequency measurement. The intra-frequency measurement means that the UE measures same frequencies of a current serving cell. The inter-frequency measurement means that the UE measures a frequency of a non-serving cell. The inter-frequency measurement and the inter-RAT measurement are collectively referred to as non-intra-frequency measurement.

For the intra-frequency measurement, the UE may constantly perform the measurement because the UE is constantly listening to the frequency of the serving cell. However, for the non-intra-frequency measurement, the UE cannot constantly perform the measurement because the UE needs to adjust a frequency of a receiver from the frequency of the serving cell to a frequency of a neighboring cell. In LTE, the UE performs non-intra-frequency measurement during a particular period of time. The period of time is referred to as a measurement gap. In the measurement gap, the UE can receive only a corresponding to-be-measured signal, and cannot send or receive data. For example, when a length of the measurement gap is set to 6 ms, it indicates that data transmission and reception of the UE are interrupted continuously for 6 ms. In this way, the UE can transmit data only after the measurement gap ends. Therefore, when the UE needs to transmit low-delay service data, a delay requirement cannot be satisfied.

SUMMARY

A technical problem to be resolved in this application is to provide a measurement method, a measurement configuration method, and a related device, to discontinuously perform measurement in a measurement gap, and further reduce a data transmission delay.

According to a first aspect, this application provides a measurement method, including: receiving, by a terminal device, measurement configuration information; and measuring, by the terminal device, in m measurement windows in a measurement gap based on the measurement configuration information, m groups of to-be-measured signals sent by a network device, where m is an integer greater than 1. The terminal device receives the measurement configuration information sent by a network device, and the network device may be a serving base station of the terminal device. The network device that sends the m groups of to-be-measured signals may be the serving base station of the terminal device, or may be a neighboring base station of the terminal device. The network device that sends the measurement configuration information may be different from the network device that sends the m groups of to-be-measured signals.

The measurement configuration information indicates a rule used by the terminal device to measure a to-be-measured cell. The to-be-measured cell may be a serving cell of the terminal device, or may be a neighboring cell of the terminal device. The measurement configuration information may be sent by a serving base station of the terminal device, or may be sent by a neighboring base station of the terminal device, or may be sent by another network device to the terminal device. The measurement gap indicates a time interval in which the terminal device can perform cell measurement. The measurement gap may periodically appear, and the terminal device may perform cell measurement in each measurement gap. In embodiments of this application, the measurement gap includes m measurement windows. The terminal device measures, in the m measurement windows, the m groups of to-be-measured signals sent by the network device, and measures, in each measurement window, one group of to-be-measured signals sent by the network device. A type of the to-be-measured signal is not limited, and a quantity of to-be-measured signals in each group of to-be-measured signals is not limited either. A gap exists between two neighboring measurement windows in the measurement gap, and the gap is referred to as a measurement window gap. Because there are m measurement windows in the measurement gap, there are m−1 measurement window gaps. In embodiments of this application, the terminal device performs measurement in only the m measurement windows in the measurement gap, but do not perform cell measurement in the m−1 measurement window gaps, so that the terminal device can transmit data in the m−1 measurement window gaps.

When the terminal device discontinuously performs cell measurement in the measurement gap, the terminal device does not need to occupy the entire measurement gap to perform cell measurement, and the terminal device can transmit data in the measurement window gap in the measurement gap. In this way, the data is transmitted before the entire measurement gap ends, and a data transmission delay is further reduced.

In a possible implementation of the first aspect, the measurement configuration information includes: one or more of a bandwidth of each to-be-measured signal, a start time offset of the measurement gap, a period of the measurement gap, a length of each of the m measurement windows in the measurement gap, a length of the measurement gap, the quantity m of measurement windows in the measurement gap, a length of each of the m−1 measurement window gaps in the measurement gap, and a total length of the m measurement windows in the measurement gap.

The bandwidth of each to-be-measured signal indicates a bandwidth of a subcarrier occupied by the to-be-measured signal, and a minimum granularity of the bandwidth of the to-be-measured signal may be a subcarrier bandwidth. To be specific, the bandwidth of the to-be-measured signal may be an integer multiple of a subcarrier bandwidth of a communications system. The start time offset of the measurement gap indicates an offset between a start time of the measurement gap and a particular time point. For example, the start time offset is an offset between the start time of the measurement gap and a start time of a subframe 0. The terminal device may determine the start time of the measurement gap based on the start time offset. In embodiments of this application, the measurement gap may periodically appear, and the period of the measurement gap indicates a time interval between two consecutive measurement gaps. The length of the measurement gap indicates duration of the measurement gap.

In a possible implementation of the first aspect, the measurement configuration information includes: one or more of a bandwidth of each to-be-measured signal, a start time offset of the measurement gap, a period of the measurement gap, a length of the measurement gap, a length of the measurement window in the measurement gap, a length of the measurement window gap in the measurement gap, a period of the measurement window in the measurement gap, the quantity of measurement windows in the measurement gap, and a total length of the m measurement windows in the measurement gap. In the measurement gap, the lengths of the m measurement windows are equal, and the lengths of the m−1 measurement window gaps are equal.

In a possible implementation of the first aspect, the m groups of to-be-measured signals are m groups of synchronization signals, each group of synchronization signals includes at least one synchronization signal, the measurement gap is a time domain interval of a synchronization signal burst set, and the measurement window is a time domain interval of a synchronization signal resource block in the synchronization signal burst set; and the measurement configuration information includes: one or more of a bandwidth of each synchronization signal, duration of the synchronization signal resource block, a quantity m of synchronization signal resource blocks in the synchronization signal burst set, a length of a synchronization signal resource block gap in the synchronization signal burst set, a period of the synchronization signal burst set, and a start time offset of the synchronization signal burst set.

The synchronization signal burst set includes the m synchronization signal resource blocks, the m synchronization signal resource blocks have same duration, and the duration of the synchronization signal resource block indicates a length of the time domain interval of the synchronization signal resource block. The synchronization signal resource block gap indicates an interval between two neighboring synchronization signal resource blocks.

It should be noted that each synchronization signal resource block corresponds to one beam, and the measurement configuration information further includes a mapping rule between a beam and a synchronization signal resource block. The network device may send a beam to the terminal device by using a transmission resource of the synchronization signal resource block.

In a possible implementation of the first aspect, the m groups of to-be-measured signals are m groups of synchronization signals, the measurement gap is a time domain interval of a synchronization signal burst set, and the measurement window is a time domain interval of a group of synchronization signals in the synchronization signal burst set; and the measurement configuration information includes: one or more of a bandwidth of each synchronization signal, duration of each of the m groups of synchronization signals in the synchronization signal burst set, duration of each of m synchronization signal resource blocks in the synchronization signal burst set, a length of each of m−1 synchronization signal intervals in the synchronization signal burst set, a period of the synchronization signal burst set, and a start time offset of the synchronization signal burst set.

The synchronization signal interval indicates an interval between two neighboring groups of synchronization signals.

It should be noted that each synchronization signal resource block corresponds to one beam, and the measurement configuration information further includes a mapping rule between a beam and a synchronization signal resource block. The network device may send a beam to the terminal device by using a transmission resource of the synchronization signal resource block.

In a possible implementation of the first aspect, the m groups of to-be-measured signals are m groups of reference signals, and a type of the reference signal is not limited; the measurement gap is a time domain interval of a reference signal set; and the measurement window is a time domain interval of a group of reference signals in the reference signal set; and the measurement configuration information includes: one or more of a reference signal mapping rule, a bandwidth of each reference signal, a start time offset of the reference signal set, duration of the reference signal set, a period of the reference signal set, and a quantity of reference signals in the reference signal set, where the reference signal mapping rule indicates a mapping rule between a reference signal and a beam and a mapping rule between a reference signal and a time-frequency resource set corresponding to the reference signal set.

One beam includes a group of reference signals, and the group of reference signals includes at least one reference signal. A length of a time domain interval of the time-frequency resource set corresponding to the reference signal set is equal to the duration of the reference signal set. A length of a frequency domain interval of the time-frequency resource set is not limited in this embodiment, and may be bandwidths of a plurality of subcarriers.

In a possible implementation of the first aspect, the mapping rule between the reference signal and the time-frequency resource corresponding to the reference signal set may be mapping first in time domain and then in frequency domain or mapping first in frequency domain and then in time domain.

In a possible implementation of the first aspect, all m−1 reference signal intervals in the reference signal set are zero, and the reference signal interval is an interval between two neighboring reference signals. The m groups of reference signals are continuously sent, and there is no interval between two neighboring groups of reference signals.

In a possible implementation of the first aspect, the measurement configuration information further includes:

any one of common measurement indication information, specified frequency measurement indication information, and specified cell measurement indication information; the common measurement indication information indicates that the measurement configuration information is applied to all cells; the specified frequency measurement indication information indicates that the measurement configuration information is applied to a cell corresponding to at least one specified frequency; and the specified cell measurement indication information indicates that the measurement configuration information is applied to at least one specified cell.

According to a second aspect, this application provides a measurement configuration method, including: sending, by a network device, measurement configuration information to a terminal device; and sending, by the network device, m groups of to-be-measured signals in m measurement windows in a measurement gap based on the measurement configuration information, where m is an integer greater than 1.

The network device does not need to occupy the entire measurement gap to send the to-be-measured signal, and the network device can transmit data in the measurement window gap in the measurement gap. In this way, the data is transmitted before the entire measurement gap ends, and a data transmission delay is further reduced.

In a possible implementation of the second aspect, before the sending, by a network device, measurement configuration information to a terminal device, the method further includes: adjusting, by the network device, lengths of the m measurement windows based on a service delay requirement, where a minimum granularity of the measurement window is one transmission time interval (TTI); and when a service delay requirement is lower, to be specific, when a lower transmission delay is required, the length of the measurement window is shorter; otherwise, the length of the measurement window is longer.

In a possible implementation of the second aspect, the measurement configuration information further includes: any one of common measurement indication information, specified frequency measurement indication information, and specified cell measurement indication information; the common measurement indication information indicates that the measurement configuration information is applied to all cells; the specified frequency measurement indication information indicates that the measurement configuration information is applied to a cell corresponding to at least one specified frequency; and the specified cell measurement indication information indicates that the measurement configuration information is applied to at least one specified cell; and the sending, by a network device, measurement configuration information to a terminal device includes: sending, by the network device to the terminal device, a system message or a Radio Resource Control (RRC) message that carries the measurement configuration information.

In a possible implementation of the second aspect, the system message includes at least one of a master information block (MIB), a system information block (SIB), minimum system information (MSI), or remaining minimum system information (RMSI); and the RRC message includes any one of a RRC connection reconfiguration message, a RRC connection reestablishment message, a RRC connection setup message, and an RRC connection resume message.

According to a third aspect, this application provides a measurement method, including: receiving, by a terminal device, a plurality of pieces of measurement configuration information; selecting, by the terminal device, measurement configuration information from the plurality of pieces of measurement configuration information, and measuring, by the terminal device, a to-be-measured cell in a measurement gap based on the selected measurement configuration information; and receiving, by the terminal device, measurement configuration information sent by at least one network device.

The terminal device stores the plurality of pieces of measurement configuration information sent by the network device, and the plurality of pieces of measurement configuration information indicate different measurement rules. The plurality of pieces of measurement configuration information may be sent by one network device. The network device may be a serving base station of the terminal device, or the network device may be a neighboring base station of the terminal device (for example, in a dual connectivity or multi-connectivity scenario). The plurality of pieces of measurement configuration information may be sent by a plurality of network devices. The terminal device may select appropriate measurement configuration information from the plurality of pieces of measurement configuration information based on a related attribute of the to-be-measured cell, and measure the to-be-measured cell based on the appropriate measurement configuration information, to avoid a case in which a same piece of measurement configuration information is used for measurement in an entire communications system, thereby adapting to different application scenarios, and improving measurement flexibility.

In a possible implementation of the third aspect, the plurality of pieces of measurement configuration information are a plurality of pieces of specified frequency measurement configuration information; and the selecting, by the terminal device, measurement configuration information from the plurality of pieces of measurement configuration information includes: obtaining, by the terminal device, a frequency of the to-be-measured cell; and selecting, by the terminal device, the measurement configuration information associated with the frequency of the to-be-measured cell from the plurality of pieces of measurement configuration information.

In a possible implementation of the third aspect, the plurality of pieces of measurement configuration information are a plurality of pieces of specified cell measurement configuration information; and the selecting, by the terminal device, measurement configuration information from the plurality of pieces of measurement configuration information includes: obtaining, by the terminal device, an identifier of the to-be-measured cell; and selecting, by the terminal device, the measurement configuration information associated with the identifier of the to-be-measured cell from the plurality of pieces of measurement configuration information.

In a possible implementation of the third aspect, the measurement configuration information includes a length of the measurement gap and/or a period of the measurement gap.

In a possible implementation of the third aspect, when there are a plurality of to-be-measured cells, the measuring, by the terminal device, a to-be-measured cell in a measurement gap based on the selected measurement configuration information includes: measuring, by the terminal device, the plurality of cells in the measurement gap based on the selected measurement configuration information in a measurement order indicated by the network device.

There may be one or more pieces of selected measurement configuration information, and there may be one or more to-be-measured cells. The cells may be measured by using different pieces of measurement configuration information, or the plurality of cells may be measured by using same piece of measurement configuration information.

In a possible implementation, the to-be-measured cells are an LTE cell and an NR cell; the terminal device, the LTE cell, and the NR cell form a dual connectivity mode; and a period of a measurement gap in the LTE cell is equal to a period of a synchronization signal in the NR cell.

According to a fourth aspect, this application provides a measurement method, including: receiving, by a terminal device, an indication message sent by a network device; and determining, by the terminal device, measurement configuration information in a plurality of pieces of prestored measurement configuration information according to the indication message, and measuring, by the terminal device, a to-be-measured cell in a measurement gap based on the determined measurement configuration information.

There may be one or more to-be-measured cells, and there may be one or more pieces of determined measurement configuration information. The cells may be measured by using different pieces of measurement configuration information, or the plurality of cells may be measured by using a same piece of measurement configuration information. The terminal device may prestore the plurality of pieces of measurement configuration information sent by the network device, the terminal device determines the measurement configuration information according to the indication message of the network device, and the terminal device measures the to-be-measured cell based on the determined measurement configuration information.

In a possible implementation, when there are a plurality of to-be-measured cells, the measuring, by the terminal device, a to-be-measured cell in a measurement gap based on the determined measurement configuration information includes measuring, by the terminal device, the plurality of cells based on the determined measurement configuration information in a measurement order indicated by the network device.

In a possible implementation, the to-be-measured cells are an LTE cell and an NR cell; the terminal device, the LTE cell, and the NR cell form a dual connectivity mode; and a period of a measurement gap in the LTE cell is equal to a period of a synchronization signal in the NR cell.

According to a fifth aspect, this application provides a measurement method, including: receiving, by a terminal device, at least one of a period, a time offset, or a number of a synchronization signal burst set in a to-be-measured cell that are sent by a network device, where the time offset is a location offset between a synchronization signal burst set indicated by the number in a serving cell and the synchronization signal burst set indicated by the number in the to-be-measured cell; determining, by the terminal device, a location of the synchronization signal burst set in the to-be-measured cell based on a period of the synchronization signal burst set in the serving cell, the period of the synchronization signal burst set in the to-be-measured cell, and the time offset; and measuring, by the terminal device, the to-be-measured cell based on the location of the synchronization signal burst set in the to-be-measured cell.

In a possible implementation, the number is a subframe number and/or a system frame number.

In a possible implementation, the receiving, by a terminal device, at least one of a period, a time offset, or a number of a synchronization signal burst set in a to-be-measured cell that are sent by a network device includes: receiving, by the terminal device, RRC signaling that is sent by the network device and that carries the at least one of the period, the time offset, or the number of the synchronization signal burst set in the to-be-measured cell.

According to another aspect, a measurement apparatus is provided. The measurement apparatus may be a terminal device, or may be a chip. The measurement apparatus has a function of implementing behavior of the terminal device in the method according to the first aspect. The function may be implemented by using hardware, or implemented by executing corresponding software by hardware. The hardware or the software includes one or more modules corresponding to the foregoing function.

In a possible implementation, the measurement apparatus includes a receiving unit and a measurement unit, where the receiving unit is configured to receive measurement configuration information; and the measurement unit is configured to measure, in m measurement windows in a measurement gap based on the measurement configuration information, m groups of to-be-measured signals sent by a network device, where m is an integer greater than 1.

In another possible implementation, the measurement apparatus includes a transceiver, a memory, and a processor, where the transceiver is configured to receive measurement configuration information; the memory stores a set of program code; and the processor is configured to invoke the program code stored in the memory, to perform the following operations: measuring, in m measurement windows in a measurement gap based on the measurement configuration information, m groups of to-be-measured signals sent by a network device, where m is an integer greater than 1.

Based on a same invention concept, for a problem resolving principle and beneficial effects of the apparatus, the foregoing possible method implementations of the terminal device and the resulting beneficial effects may be referred to. For implementation of the apparatus, the implementation of the method may be referred to.

According to another aspect, a measurement configuration apparatus is provided. The measurement configuration apparatus may be a network device, or may be a chip. The measurement configuration apparatus has a function of implementing behavior of the network device in the method according to the second aspect. The function may be implemented by using hardware, or implemented by executing corresponding software by hardware. The hardware or the software includes one or more modules corresponding to the foregoing function.

In a possible implementation, the measurement configuration apparatus includes a sending unit, where the sending unit is configured to: send measurement configuration information to a terminal device; and send, in m measurement windows in a measurement gap based on the measurement configuration information, m groups of to-be-measured signals to the terminal device, where m is an integer greater than 1.

In another possible implementation, the measurement configuration apparatus includes a transceiver.

The transceiver is configured to send measurement configuration information to a terminal device; and send, in m measurement windows in a measurement gap based on the measurement configuration information, m groups of to-be-measured signals to the terminal device, where m is an integer greater than 1.

Based on a same invention concept, for a problem resolving principle and beneficial effects of the apparatus, refer to the foregoing possible method implementations of the network device and the brought beneficial effects. Therefore, for implementation of the apparatus, refer to the implementation of the method. Repeated descriptions are not described again.

According to another aspect, a measurement apparatus is provided. The measurement apparatus has a function of implementing behavior of the measurement apparatus in the method according to the third aspect. The measurement apparatus may be a terminal device, or may be a chip. The function may be implemented by using hardware, or implemented by executing corresponding software by hardware. The hardware or the software includes one or more modules corresponding to the foregoing function.

In a possible implementation, the measurement apparatus includes a receiving unit and a measurement unit, where the receiving unit is configured to receive a plurality of pieces of measurement configuration information; and the measurement unit is configured to: select measurement configuration information from the plurality of pieces of measurement configuration information, and measure a to-be-measured cell in a measurement gap based on the selected measurement configuration information.

In another possible implementation, the measurement apparatus includes a transceiver, a memory, and a processor, where the transceiver is configured to receive a plurality of pieces of measurement configuration information; the memory stores a set of program code; and the processor is configured to invoke the program code stored in the memory, to perform the following operations: selecting measurement configuration information from the plurality of pieces of measurement configuration information; and measuring a to-be-measured cell in a measurement gap based on the selected measurement configuration information.

Based on a same invention concept, for a problem resolving principle and beneficial effects of the apparatus, the foregoing possible method implementations of the terminal device and the resulting beneficial effects may be referred to. For implementation of the apparatus, the implementation of the method may be referred to.

According to another aspect, a measurement apparatus is provided. The measurement apparatus may be a terminal device, or may be a chip. The measurement apparatus has a function of implementing behavior of the terminal device in the method according to the fourth aspect. The function may be implemented by using hardware, or implemented by executing corresponding software by hardware. The hardware or the software includes one or more modules corresponding to the foregoing function.

In a possible implementation, the measurement apparatus includes a receiving unit and a measurement unit, where the receiving unit is configured to receive an indication message sent by a network device; and the measurement unit is configured to: determine measurement configuration information in a plurality of pieces of prestored measurement configuration information according to the indication message, and measure a to-be-measured cell in a measurement gap based on the determined measurement configuration information.

In another possible implementation, the measurement apparatus includes a transceiver, a memory, and a processor, where the transceiver is configured to receive an indication message sent by a network device; the memory stores a set of program code; and the processor is configured to invoke the program code stored in the memory, to perform the following operations: determining measurement configuration information in a plurality of pieces of prestored measurement configuration information according to the indication message; and measuring a to-be-measured cell in a measurement gap based on the determined measurement configuration information.

Based on a same invention concept, for a problem resolving principle and beneficial effects of the apparatus, the foregoing possible method implementations of the network device and the resulting beneficial effects may be referred to. For implementation of the apparatus, the implementation of the method may be referred to.

According to another aspect, a measurement apparatus is provided. The measurement apparatus may be a terminal device, or may be a chip. The measurement apparatus has a function of implementing behavior of the terminal device in the method according to the fifth aspect. The function may be implemented by using hardware, or implemented by executing corresponding software by hardware. The hardware or the software includes one or more modules corresponding to the foregoing function.

In a possible implementation, the measurement apparatus includes a receiving unit, a determining unit, and a measurement unit, where the receiving unit is configured to receive at least one of a period, a time offset, or a number of a synchronization signal burst set in a to-be-measured cell that are sent by a network device, where the time offset is a location offset between a synchronization signal burst set indicated by the number in a serving cell and the synchronization signal burst set indicated by the number in the to-be-measured cell; the determining unit is configured to determine a location of the synchronization signal burst set in the to-be-measured cell based on a period of the synchronization signal burst set in the serving cell, the period of the synchronization signal burst set in the to-be-measured cell, and the time offset; and the measurement unit is configured to measure the to-be-measured cell based on the location of the synchronization signal burst set in the to-be-measured cell.

In another possible implementation, the measurement apparatus includes a transceiver, a memory, and a processor, where the transceiver is configured to receive at least one of a period, a time offset, or a number of a synchronization signal burst set in a to-be-measured cell that are sent by a network device; the memory stores a set of program code; and the processor is configured to invoke the program code stored in the memory, to perform the following operations: determining a location of the synchronization signal burst set in the to-be-measured cell based on a period of the synchronization signal burst set in the serving cell, the period of the synchronization signal burst set in the to-be-measured cell, and the time offset; and measuring the to-be-measured cell based on the location of the synchronization signal burst set in the to-be-measured cell.

Based on a same invention concept, for a problem resolving principle and beneficial effects of the apparatus, the foregoing possible method implementations of the terminal device and the resulting beneficial effects may be referred to. For implementation of the apparatus, the implementation of the method may be referred to.

The transceiver in the foregoing aspects may include at least one of a transmitter or a receiver. The transmitter is configured to perform the sending step in the foregoing method, and the receiver is configured to perform the receiving step in the foregoing method.

Still another aspect of this application provides a computer-readable storage medium, the computer-readable storage medium stores an instruction, and when the instruction is run on a computer, the computer is enabled to perform the methods according to the foregoing aspects.

Still another aspect of this application provides a computer program product including an instruction, and when the computer program product is run on a computer, the computer is enabled to perform the methods according to the foregoing aspects.

BRIEF DESCRIPTION OF DRAWINGS

To describe the technical solutions in the embodiments of the present invention or in the background more clearly, the following briefly describes the accompanying drawings for describing the embodiments of the present invention or the background.

FIG. 2d is still another sequence diagram of measurement performed by a terminal device according to an embodiment of the present invention;

FIG. 9 is a schematic structural diagram of still another measurement apparatus according to an embodiment of the present invention;

FIG. 10a is a schematic flowchart of still another measurement method according to an embodiment of the present invention;

DESCRIPTION OF EMBODIMENTS

The following describes the embodiments of the present invention with reference to the accompanying drawings in the embodiments of the present invention.

Figure 1A:
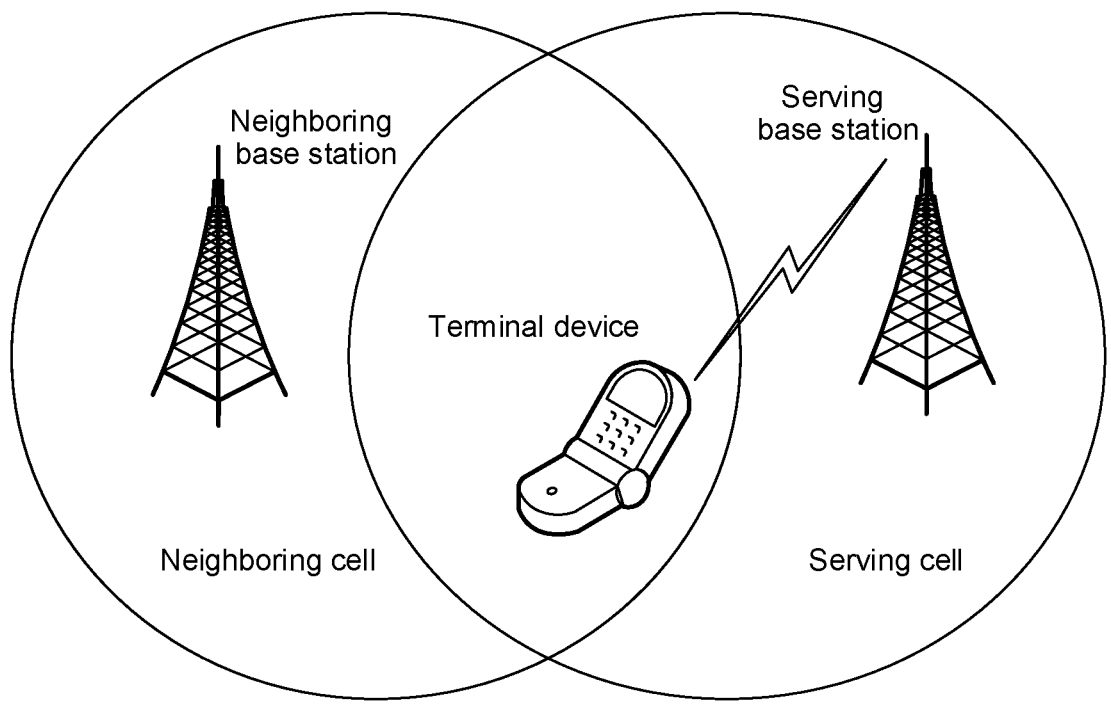
FIG. 1a is a schematic architectural diagram of a communications system according to an embodiment of the present invention.

FIG. 1a is a schematic architectural diagram of a communications system according to an embodiment of the present invention. The communications system includes a base station and a terminal device. FIG. 1a shows that a neighboring base station, a serving base station, and a terminal device communicate with each other. The communications system may be a global system for mobile communications (GSM), a code division multiple access (CDMA) system, a wideband code division multiple access (WCDMA) system, a worldwide interoperability for microwave access (WiMAX) system, a long term evolution (LTE) system, a 5G communications system (for example, new radio (NR)) system, a communications system integrating a plurality of communications technologies (for example, a communications system integrating an LTE technology and an NR technology), or a subsequent evolved communications system. Forms and quantities of the base stations and the terminal devices shown in FIG. 1a are merely used as an example, and do not constitute a limitation to the embodiments of the present invention.

The terminal device in this application is a device having a wireless communication function, and may be deployed on the land, including indoor, outdoor, handheld, wearable, or in-vehicle; may be deployed on the water (for example, in a steamship); or may be deployed in the air (for example, on an airplane, on a balloon, or on a satellite). The terminal device may be a mobile phone, a tablet computer (Pad), a computer having wireless transmission and reception functions, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. Alternatively, the terminal device may be a handheld device, an in-vehicle device, a wearable device, a computing device, another processing device connected to a wireless modem, or the like that has a wireless communication function. In different networks, the terminal device may have different names, for example, a terminal device, an access terminal, a subscriber unit, a subscriber station, a mobile station, a remote station, a remote terminal, a mobile device, a user terminal, a terminal, a wireless communications device, a user agent or a user apparatus, a cellular phone, a cordless telephone set, a session initiation protocol (SIP) telephone, a wireless local loop (WLL) station, a personal digital assistant (PDA), and a terminal device in a 5G network or a future evolved network.

The base station in this application may also be referred to as a base station device, and is a device that is deployed in a radio access network and that is configured to provide a wireless communication function. The device includes but is not limited to a base station (for example, a base transceiver station (BTS), a NodeB (NB), an evolved NodeB (eNB or eNodeB), a transmission node or a transmission reception point (TRP or TP) or a next generation NodeB (gNB) in an NR system, or a base station or a network device in a future communications network), a relay node, an access point, an in-vehicle device, a wearable device, a wireless fidelity (Wi-Fi) site, a wireless backhaul node, a small cell, a micro base station, and the like.

Figure 1B:
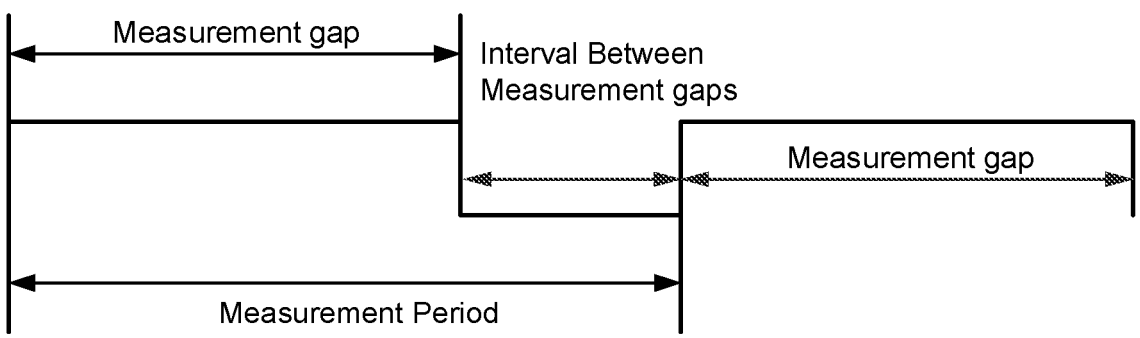
FIG. 1b is a sequence diagram of measurement performed by an conventional terminal device.

FIG. 1b is a schematic diagram of cell measurement performed by a terminal device in an LTE communications system. In FIG. 1b, a high-level interval indicates a measurement gap, and a low-level interval indicates a gap between two measurement gaps. The measurement gap periodically appears. The terminal device measures a neighboring cell in the measurement gap based on measurement configuration information sent by a serving base station. When performing measurement in the measurement gap, the terminal device cannot transmit data, and can transmit the data within only the interval between the two measurement gaps. In this way, the terminal device can transmit the data only after the entire measurement gap ends. Consequently, data transmission is interrupted for a relatively long time, and a low delay requirement of some data transmissions cannot be satisfied.

Some embodiments of the present invention provide data transmission methods. When a terminal device discontinuously performs cell measurement in a measurement gap, the terminal device does not need to occupy the entire measurement gap to perform cell measurement, and the terminal device can transmit data in a measurement window gap in the measurement gap. In this way, in embodiments of the present invention, data is transmitted before the entire measurement gap ends, and a data transmission delay is further reduced.

Figure 2A:
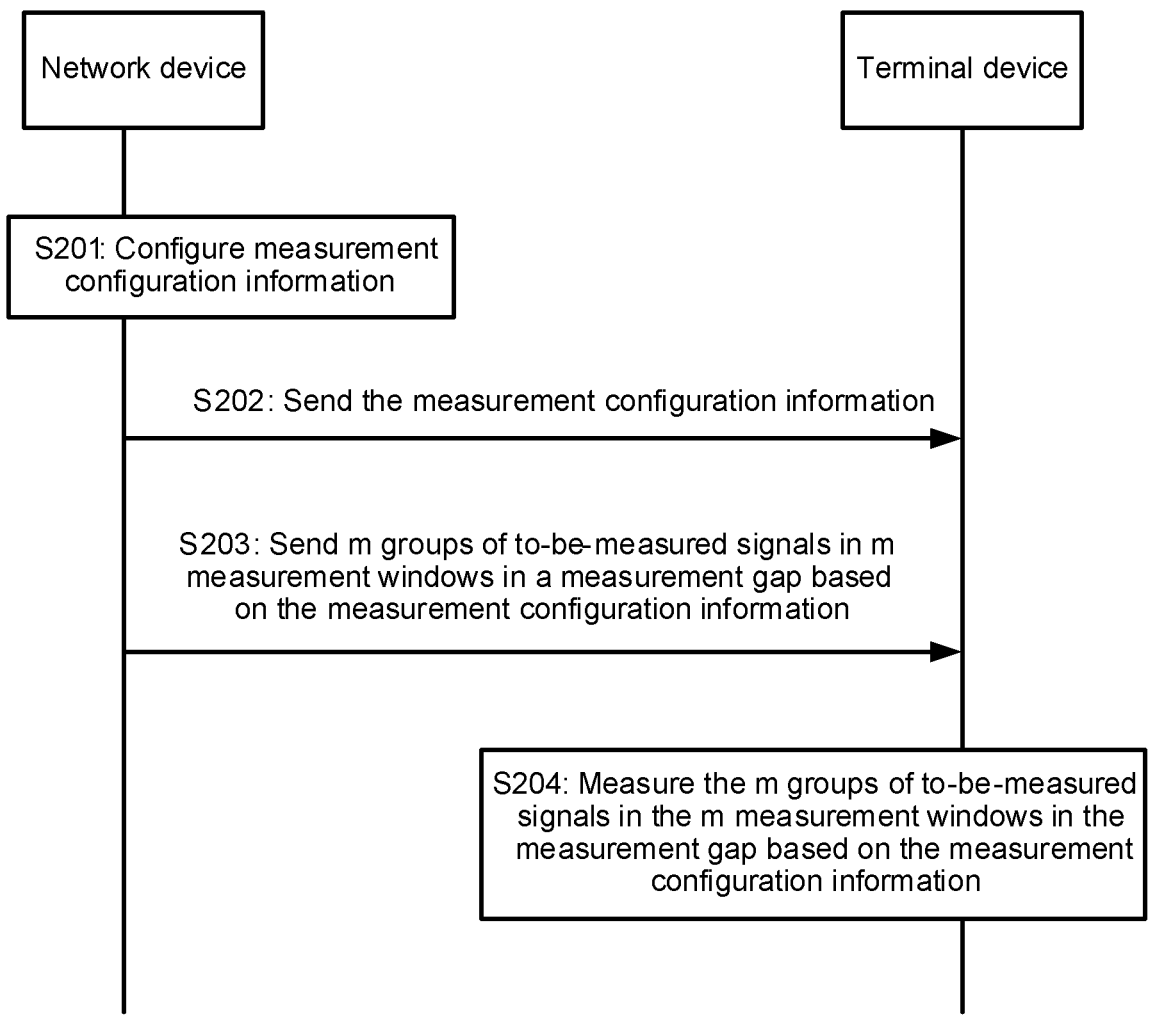
FIG. 2a is a schematic flowchart of a measurement method according to an embodiment of the present invention.

FIG. 2a is a schematic flowchart of a measurement method according to an embodiment of the present invention. The method includes, but is not limited to, the following steps.

S201: A network device configures measurement configuration information.

Specifically, the network device configures the measurement configuration information for a terminal device, and the measurement configuration information is used to indicate a rule used by the terminal device to measure a to-be-measured cell. The to-be-measured cell may be a serving cell, or may be a non-serving cell (for example, a neighboring cell). This is not limited in embodiments. When performing cell measurement based on the measurement configuration information, the terminal device may perform measurement in a serving cell or a non-serving cell. A process in which the terminal device performs measurement in a serving cell is referred to as intra-frequency measurement. Measurement performed by the terminal device in a non-serving cell is classified into inter-frequency measurement and inter-RAT measurement. The inter-frequency measurement indicates that the terminal device measures a non-serving cell of a communications system that currently provides a service, and the inter-RAT measurement indicates that the terminal device measures a non-serving cell of another communications system. For ease of description, in embodiments, the inter-RAT measurement and the inter-frequency measurement are collectively referred to as non-intra-frequency measurement. It should be noted that the network device in this step may be a serving base station of the terminal device, and the network device sends the measurement configuration information to the terminal device that camps on the cell.

Optionally, the network device may configure a plurality of pieces of measurement configuration information, and the plurality of pieces of measurement configuration information may have different measurement rules. In a possible implementation, each of the plurality of pieces of measurement configuration information is associated with one frequency. For example, the network device configures measurement configuration information 1, measurement configuration information 2, and measurement configuration information 3, where the measurement configuration information 1 is associated with a frequency 1, the measurement configuration information 2 is associated with a frequency 2, and the measurement configuration information 3 is associated with a frequency 3.

In another possible implementation, each of the plurality of pieces of measurement configuration information is associated with one cell. For example, the network device configures measurement configuration information 1, measurement configuration information 2, and measurement configuration information 3, where the measurement configuration information 1 is associated with a cell 1, the measurement configuration information 2 is associated with a cell 2, and the measurement configuration information 3 is associated with a cell 3.

S202: The network device sends the measurement configuration information to the terminal device, and the terminal device receives the measurement configuration information sent by the network device.

Optionally, the network device sends, to the terminal device, a system message or an RRC message that carries the measurement configuration information. The system message includes but is not limited to at least one of an MIB or an SIB in an LTE system, and at least one of MSI, RMSI, or other system information in a 5G communications system. The RRC message includes but is not limited to any one of an RRC connection reconfiguration message, an RRC connection reestablishment message, an RRC connection setup message, or an RRC connection resume message.

Optionally, the measurement configuration information may further include: any one of common measurement indication information, specified frequency measurement indication information, and specified cell measurement indication information.

The common measurement indication information indicates that the measurement configuration information is applied to all cells. All the cells may be all cells in a specified communications system or all cells in a communications system supported by the terminal device.

The specified frequency measurement indication information indicates that the measurement configuration information is applied to all cells corresponding to at least one specified frequency.

For example, the specified frequency measurement indication information indicates that frequencies associated with measurement configuration information 1 are a frequency 1, a frequency 2, and a frequency 3. It is assumed that the terminal device learns that a frequency of the to-be-measured cell is the frequency 1, the terminal device determines that the frequency 1 is associated with the measurement configuration information 1, and the terminal device measures the to-be-measured cell based on the measurement configuration information 1. For another example, the specified frequency measurement indication information indicates that frequencies associated with measurement configuration information 2 are a frequency 4, a frequency 5, and a frequency 6. It is assumed that the terminal device learns that a frequency of the to-be-measured cell is the frequency 4, the terminal device determines that the frequency 4 is associated with the measurement configuration information 2, and the terminal device measures the to-be-measured cell based on the measurement configuration information 2.

The specified cell measurement indication information indicates that the measurement configuration information is applied to at least one specified cell.

For example, the specified cell measurement indication information indicates that cell identifiers associated with measurement configuration information 1 are a cell identifier 1 and a cell identifier 2. It is assumed that the terminal device learns that a cell identifier of the to-be-measured cell is the cell identifier 1, the terminal device determines that the cell identifier 1 is associated with the measurement configuration information 1, and the terminal device measures the to-be-measured cell based on the measurement configuration information 1. For another example, the specified cell measurement indication information indicates that cell identifiers associated with measurement configuration information 2 are a cell identifier 3 and a cell identifier 4. It is assumed that the terminal device learns that a cell identifier of the to-be-measured cell is the cell identifier 4, the terminal device determines that the cell identifier 4 is associated with the measurement configuration information 2, and the terminal device performs cell measurement on the to-be-measured cell based on the measurement configuration information 2. The cell identifier is used to uniquely indicate a cell, and the cell identifier may be a cell ID or a physical cell identifier (PCI).

Optionally, the network device adjusts lengths of m measurement windows in a measurement gap based on a service delay requirement.

A smaller data transmission delay indicated by the service delay requirement indicates a shorter length of the measurement window. A larger data transmission delay indicated by the service delay requirement indicates a longer length of the measurement window.

For example, the lengths of all the m measurement windows in the measurement gap are equal. When the service delay requirement is 2 ms, the network device adjusts the lengths of the m measurement windows to 1 ms. Alternatively, when the service delay requirement is 5 ms, the network device may adjust the lengths of the m measurement windows to 2 ms.

It should be noted that a correspondence between a delay time indicated by the service delay requirement and a length of the measurement window is not limited to the foregoing examples, and may be set based on another requirement. A minimum unit of the length of the measurement window may be one TTI. Thus, the length of the measurement window may be an integer multiple of a TTI of a communications system.

S203: The network device sends m groups of to-be-measured signals in the m measurement windows in the measurement gap based on the measurement configuration information, and the terminal device receives, in the m measurement windows, the m groups of to-be-measured signals sent by the network device.

The network device sends one group of to-be-measured signals in each measurement window in the measurement gap, and the measurement gap has a total of m measurement windows. In this way, the network device sends the m groups of to-be-measured signals in the measurement gap. The terminal device receives, in the m measurement windows, the m groups of to-be-measured signals sent by the network device, where the terminal device receives one group of to-be-measured signals in each of the m measurement windows.

S204: The terminal device measures the m groups of to-be-measured signals in the m measurement windows in the measurement gap based on the measurement configuration information.

A method for measuring, by the terminal device, one group of to-be-measured signals in the measurement window may be as follows: The terminal device measures, in each measurement window, a signal quality parameter of the group of to-be-measured signals sent by the network device, and then obtains a total signal quality parameter in the measurement gap by performing weighted averaging on signal quality parameters obtained through measurement in all the measurement windows, where the signal quality parameter includes one or more of an received signal strength indication, (RSSI), reference signal receiving quality (RSRQ), and a reference signal receiving power (RSRP). The terminal device may report a measurement result to the network device, and the network device determines, based on the measurement result reported by the terminal device, whether to perform a cell handover.

In this embodiment, the intra-frequency measurement is used as an example. During the intra-frequency measurement, the network device that sends the m groups of to-be-measured signals may be a serving base station of the terminal device. If the terminal device performs the non-intra-frequency measurement, the network device that sends the m groups of to-be-measured signals is a neighboring base station of the terminal device.

Optionally, the measurement configuration information includes: one or more of a bandwidth of each to-be-measured signal, a start time offset of the measurement gap, a period of the measurement gap, a length of the measurement gap, a length of the measurement window in the measurement gap, a length of a measurement window gap in the measurement gap, a period of the measurement window in the measurement gap, the quantity m of measurement windows in the measurement gap, and a total length of the m measurement windows in the measurement gap.

The bandwidth of each to-be-measured signal indicates a bandwidth of a subcarrier occupied by the to-be-measured signal, and a minimum granularity of the bandwidth of the to-be-measured signal may be a subcarrier bandwidth. For example, a bandwidth of each subcarrier in the communications system is 15 kHz, and each to-be-measured signal occupies two subcarriers in frequency domain. In this case, the bandwidth of the to-be-measured signal is 30 kHz. The start time offset of the measurement gap indicates an offset between a start time of the measurement gap and a particular time point, for example, an offset between the start time of the measurement gap and a start time of a subframe 0, so that the terminal device may determine the start time of the measurement gap based on the start time offset. The measurement gap periodically appears, and the period of the measurement gap indicates a time interval between the starts of two consecutive measurement gaps. The length of the measurement gap indicates duration of the measurement gap. The measurement window gap indicates an interval between two neighboring measurement windows.

Figure 2B:
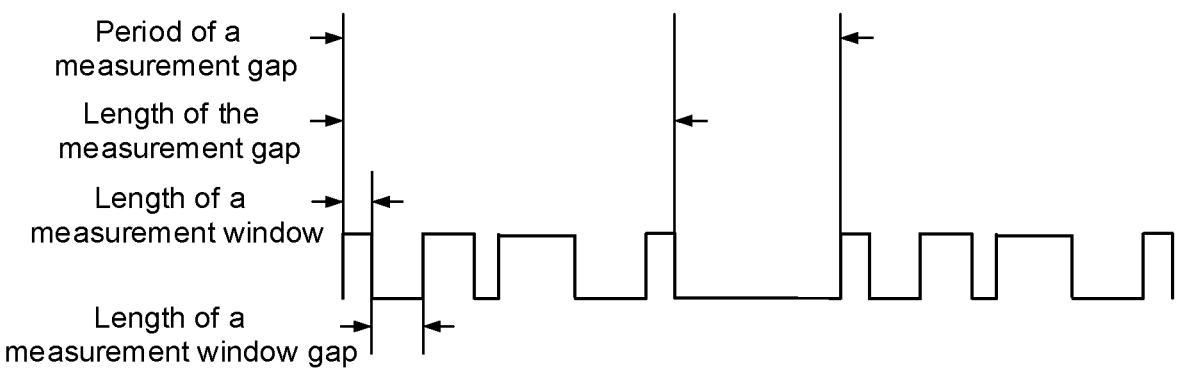
FIG. 2b is a sequence diagram of measurement performed by a terminal device according to an embodiment of the present invention.

For example, FIG. 2b is a sequence diagram in which the terminal device measures a to-be-measured cell based on measurement configuration information. A time interval in FIG. 2b includes two measurement gaps, and the terminal device measures the to-be-measured cell in each measurement gap by using a same measurement rule. Using the first measurement gap in FIG. 2b as an example, for ranges of the measurement gap, a measurement window, and a measurement window gap in FIG. 2b, refer to arrows in FIG. 2b. In the example of FIG. 2b in which the horizontal axis is time, the horizontal interval between the two highest arrows is the period of a measurement gap, the horizontal interval between the next highest two arrows is the length of the measurement gap, the horizontal interval between the next two highest arrows is a length of a measurement window, and the horizontal interval between the lowest two arrows is a length of a measurement window gap. In FIG. 2b, the measurement gap includes four measurement windows and three measurement window gaps, and lengths of the measurement windows are not equal. The measurement configuration information includes one or more of the following parameters:

a bandwidth W of each to-be-measured signal;
a start time offset $t_{offset}$ of the measurement gap;
a period $T_P$ of the measurement gap;
a length $T_{GAP}$ of the measurement gap;
the lengths of the measurement windows in the measurement gap: a length $T_{w1}$ of the first measurement window, a length $T_{w2}$ of the second measurement window, a length $T_{w3}$ of the third measurement window, and a length $T_{w4}$ of the fourth measurement window in order from left to right;
lengths of the measurement window gaps in the measurement gap: a length $T_{wg1}$ of the first measurement window gap, a length $T_{wg\ 2}$ of the second measurement window gap, and a length $T_{w3}$ of the third measurement window gap in order from left to right;
the quantity 4 of measurement windows in the measurement gap; and
a total length $T_{w\_all}$ of the four measurement windows in the measurement gap, where $T_{w\_all}=T_{w1}+T_{w2}+T_{w3}+T_{w4}$.

The terminal device measures, in each measurement window in the measurement gap based on the measurement configuration information, a signal quality parameter of one group of to-be-measured signals sent by the network device in the measurement window; obtains a signal quality parameter in the measurement gap by performing weighted averaging on signal quality parameters obtained through measurement in the four measurement windows; and the terminal device reports the signal quality parameter to the network device.

Optionally, the measurement configuration information includes: one or more of a bandwidth of each to-be-measured signal, a start time offset of the measurement gap, a period of the measurement gap, a length of the measurement gap, a length of the measurement window in the measurement gap, a length of a measurement window gap in the measurement gap, a period of the measurement window in the measurement gap, the quantity m of measurement windows in the measurement gap, and a total length of the m measurement windows in the measurement gap, where the lengths of the m measurement windows are equal, and the lengths of the m−1 measurement window gaps in the measurement gap are equal.

In some embodiments, the lengths of the measurement windows in the measurement gap are equal, the lengths of the measurement window gaps are equal, the measurement windows in the measurement gap periodically appear, and the period of the measurement window indicates a time interval between the starts of two consecutive measurement windows.

Figure 2C:
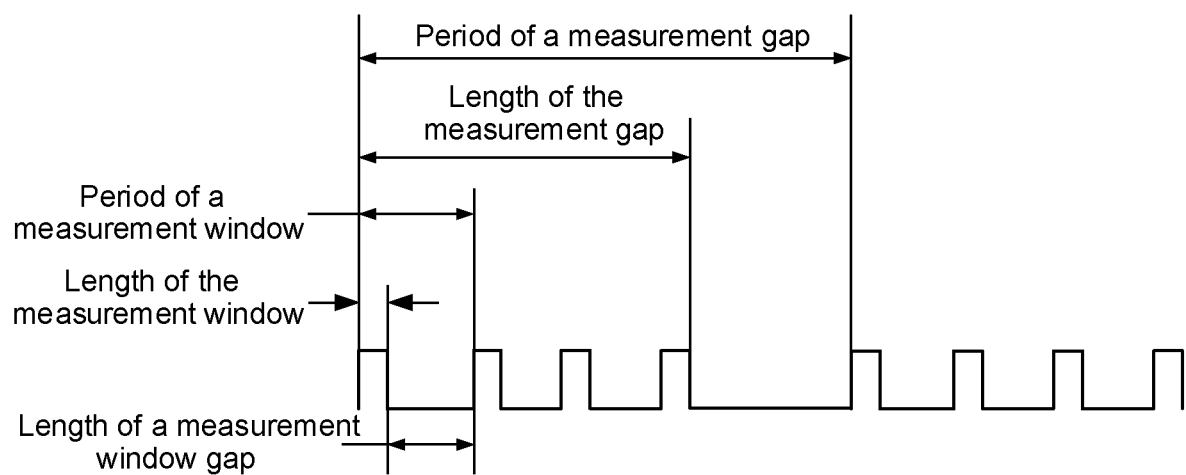
FIG. 2c is still another sequence diagram of measurement performed by a terminal device according to an embodiment of the present invention.

For example, FIG. 2c is a sequence diagram in which the terminal measures a cell based on measurement configuration information. In FIG. 2c, in a measurement gap, a high-level interval is a measurement window, a low-level interval is a measurement window gap, and the measurement gap includes four measurement windows and three measurement window gaps. The measurement configuration information includes one or more of the following parameters:

a bandwidth W of each to-be-measured signal;
a start time offset $t_{offset}$ of the measurement gap;
a period $T_P$ of the measurement gap;
a length $T_{GAP}$ of the measurement gap;
a length $T_w$ of the measurement window in the measurement gap;
a length $T_{wg}$ of the measurement window gap in the measurement gap;
the quantity 4 of measurement windows in the measurement gap; and
a total length $T_{w\_all}$ of the four measurement windows in the measurement gap, where $T_{w\_all}=4*T_w$.

The terminal device measures, in each measurement window in the measurement gap based on the measurement configuration information, a signal quality parameter of one group of to-be-measured signals sent by the network device in the measurement window; obtains a signal quality parameter in the measurement gap by performing weighted averaging on signal quality parameters obtained through measurement in the four measurement windows; and the terminal device reports the signal quality parameter to the network device.

Optionally, the measurement gap is a time domain interval of a synchronization signal burst set, the measurement window is a time domain interval of a synchronization signal resource block in the synchronization signal burst set, and the m groups of to-be-measured signals are m groups of synchronization signals; and the measurement configuration information includes:
one or more of a bandwidth of each synchronization signal, duration of the synchronization signal resource block, a quantity m of synchronization signal resource blocks in the synchronization signal burst set, a length of a synchronization signal resource block gap in the synchronization signal burst set, a period of the synchronization signal burst set, and a start time offset of the synchronization signal burst set.

The bandwidth of the synchronization signal indicates that the synchronization signal occupies bandwidths of one or more subcarriers in time domain. The synchronization signal resource block (SS block) is a time-frequency resource set, and a time-frequency resource including a preset quantity of former symbols in the synchronization signal block resource block in entire frequency domain and in time domain is used to transmit an SS. For example, the synchronization signal resource block includes seven orthogonal frequency division multiplexing (OFDM) symbols and 12 subcarriers, and a group of synchronization signals is mapped to the first three OFDM symbols of the synchronization signal resource block and resource elements (RE) on all the subcarriers. Duration of the synchronization signal resource block indicates duration of the synchronization signal resource block in time domain, for example, a length of the seven OFDM symbols. The synchronization signal resource block gap indicates an interval between two neighboring synchronization signal resource blocks.

FIG. 2d is a sequence diagram in which the terminal device performs cell measurement based on measurement configuration information. A measurement gap is a time domain interval of a synchronization signal burst set (SS burst set), and a measurement window is a length of a synchronization signal resource block. The measurement configuration information in FIG. 2d includes one or more of the following:

a bandwidth W of each synchronization signal;
duration $T_{ss\_block}$ of the synchronization signal resource block;
a quantity m of synchronization signal resource blocks in the synchronization signal burst set;

a length $T_G$ of a synchronization signal resource block gap in the synchronization signal burst set;

a period $T_{period}$ of the synchronization signal burst set; and a start time offset $t_{offset}$ of the synchronization signal burst set.

It should be noted that the measurement configuration information further includes a mapping relationship between a beam and a synchronization signal resource block. For example, for mapping information between the beam and the synchronization signal resource block, refer to FIG. 2d. In the example of FIG. 2d in which the horizontal axis is time, the horizontal interval between the two highest arrows is the length of a synchronization signal, the horizontal interval between the next highest two arrows is the length of a synchronization signal block, the horizontal interval between the next two highest arrows is synchronization signal burst set, and the horizontal interval between the lowest two arrows is the period of the synchronization signal burst set. Each synchronization signal resource block corresponds to one beam, and the network device sends the beam to the terminal device by using a transmission resource of the synchronization signal resource block.

Optionally, the measurement gap is a time domain interval of a synchronization signal burst set, the measurement window is a time domain interval of a group of synchronization signals in the synchronization signal burst set, and the m groups of to-be-measured signals are m groups of synchronization signals; and the measurement configuration information includes:

one or more of a bandwidth of each synchronization signal, duration of each of the m groups of synchronization signals in the synchronization signal burst set, duration of each of m synchronization signal resource blocks in the synchronization signal burst set, a length of each of m−1 synchronization signal intervals in the synchronization signal burst set, a period of the synchronization signal burst set, and a start time offset of the synchronization signal burst set.

The bandwidth of the synchronization signal indicates that the synchronization signal occupies bandwidths of one or more subcarriers in time domain. The SS block is a time-frequency resource set, and a time-frequency resource including a preset quantity of former symbols in the synchronization signal block resource block in entire frequency domain and in time domain is used to transmit an SS. For example, the synchronization signal resource block includes seven OFDM symbols and 12 subcarriers, and a group of synchronization signals is mapped to the first three OFDM symbols of the synchronization signal resource block and resource elements on all the subcarriers. In this case, a length of the synchronization signal is a length of the three OFDM symbols. Duration of the synchronization signal resource block indicates duration of the synchronization signal resource block in time domain, for example, a length of the seven OFDM symbols. The synchronization signal resource block gap indicates an interval between two neighboring synchronization signal resource blocks.

In another implementation, FIG. 2d is a sequence diagram in which the terminal device performs cell measurement based on measurement configuration information. A measurement gap is a time domain interval of a SS burst set, and a measurement window is a time domain interval of a group of synchronization signals. The measurement configuration information in FIG. 2d according to this implementation includes one or more of the following:

a bandwidth W of each synchronization signal;

duration $T_{ss}$ of each of m groups of synchronization signals in the synchronization signal burst set, where the groups of synchronization signals have same duration;

duration $T_{ss\_block}$ of each of m synchronization signal resource blocks in the synchronization signal burst set;

a length $T_{ss\_G}$ of each of m−1 synchronization signal intervals in the synchronization signal burst set;

a period $T_{period}$ of the synchronization signal burst set; and a start time offset $t_{offset}$ of the synchronization signal burst set.

It should be noted that the measurement configuration information further includes a mapping relationship between a beam and a synchronization signal resource block. For example, for mapping information between the beam and the synchronization signal resource block, refer to FIG. 2d. Each synchronization signal resource block corresponds to one beam, and the network device sends the beam to the terminal device by using a transmission resource of the synchronization signal resource block.

Optionally, the measurement gap is a time domain interval of a reference signal set, the measurement window is a time domain interval of a group of reference signals in the reference signal set, and the m groups of to-be-measured signals are m groups of reference signals; and the measurement configuration information includes: one or more of a reference signal mapping rule, a subcarrier of each reference signal, a start time offset of the reference signal set, duration of the reference signal set, a period of the reference signal set, and a quantity of reference signals in the reference signal set. The reference signal mapping rule indicates a mapping rule between a reference signal and a beam and a mapping rule between a reference signal and a time-frequency resource set corresponding to the reference signal set.

Figure 2E:
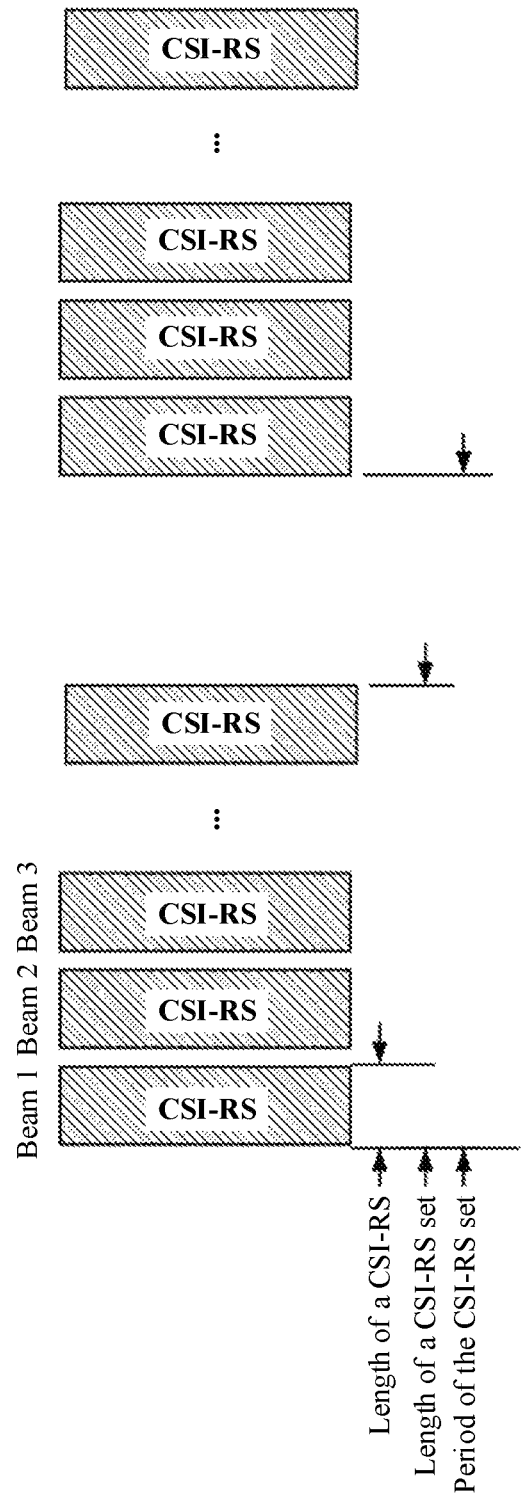
FIG. 2e is still another sequence diagram of measurement performed by a terminal device according to an embodiment of the present invention.

Referring to FIG. 2e, the reference signal is a channel state information-reference signal (CSI-RS), the reference signal set is a time-frequency resource set, and the reference signal set includes two dimensions: time domain and frequency domain. Each group of reference signals is mapped to a resource element in the reference signal set according to a particular mapping rule. To be specific, each group of reference signals corresponds to one time-frequency resource set. It should be noted that time intervals between the groups of reference signals may be equal, or may be not equal. This is not limited in this embodiment. The terminal device determines a location of each group of reference signals on the reference signal set according to the reference signal mapping rule, to correctly receive the reference signals.

Further, optionally, the interval between the groups of reference signals is zero. To be specific, the network device continuously sends the m groups of reference signals to the network device.

Further, optionally, the mapping rule between the reference signal and the time-frequency resource set corresponding to the reference signal set is mapping first in time domain and then in frequency domain or mapping first in frequency domain and then in time domain.

For example, a time-frequency resource set to which one group of reference signals is allocated is an area including the first three OFDM symbols and all 12 subcarriers of a time-frequency resource block (RB). To be specific, the reference signal can be mapped in only an area includes 3*12 REs, and it is assumed that the group of reference signals occupies 12 REs. If the mapping rule of mapping first in time domain and then in frequency domain is used, the group of reference signals is mapped to an RE including the three OFDM symbols and four subcarriers. If the mapping rule of mapping first in frequency domain and then in time domain is used, the group of reference signals is mapped to an RE including the 12 subcarriers and one OFDM symbol.

It should be noted that a parameter type included in the measurement configuration information in S203 may be the same as or different from a parameter type included in the measurement configuration information in S204. When parameters included in the measurement configuration information in S203 and S204 are different, measurement rules indicated by the two pieces of measurement configuration information are completely the same.

For example, the measurement configuration information in S203 includes: a period of the measurement gap is 40 ms, a length of the measurement gap is 7 ms, and lengths of three measurement windows in the measurement gap are all 1 ms; and the measurement configuration information in S204 includes: a period of the measurement gap is 40 ms, a length of the measurement gap is 7 ms, and lengths of two measurement window gaps in the measurement gap are both 2 ms. Although parameter types included in the measurement configuration information in S203 and S204 are different, measurement rules indicated by the two pieces of measurement configuration information are completely the same.

In the method described in FIG. 2a, when the terminal device discontinuously performs cell measurement in the measurement gap, the terminal device does not need to occupy the entire measurement gap to perform cell measurement, and the terminal device can transmit data in the measurement window gap in the measurement gap. In this way, the data is transmitted before the entire measurement gap ends, and a data transmission delay is further reduced.

In a conventional LTE communications system, even though dual connectivity (DC) is configured for a terminal device, the terminal device can measure two connected cells by using only a measurement rule indicated by a same piece of measurement configuration information. For LTE DC, it is not problematic to use single piece of measurement configuration information. However, in a scenario in which an LTE cell and an NR cell are in dual connectivity, the single piece of measurement configuration information lacks flexibility and efficiency.

Figure 3:
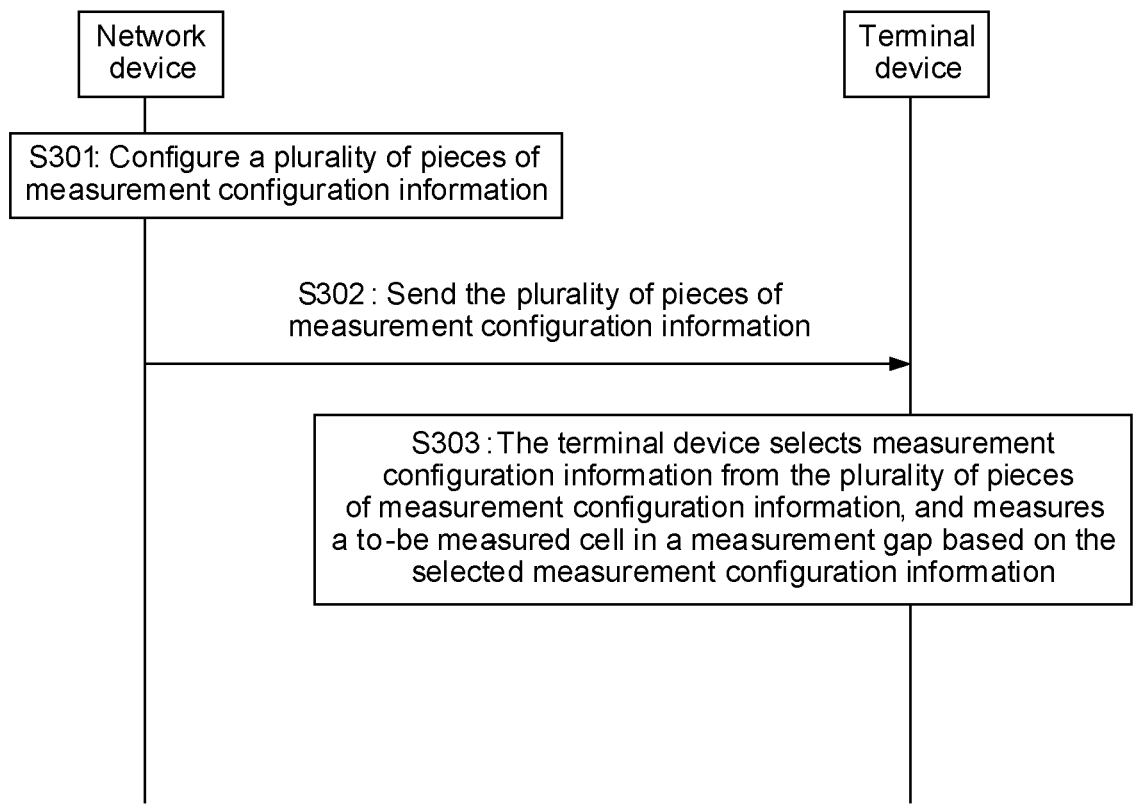
FIG. 3 is a schematic flowchart of still another measurement method according to an embodiment of the present invention.

FIG. 3 is a schematic flowchart of a measurement method according to an embodiment of the present invention. In this embodiment of the present invention, the method includes the following steps.

S301: A network device configures a plurality of pieces of measurement configuration information.

The measurement configuration information is used to indicate a rule used by a terminal device to measure a to-be-measured cell. Optionally, the measurement configuration information includes at least one of a length of a measurement gap or a period of the measurement gap. The measurement gap may be a segment of continuous time intervals shown in FIG. 1b or discontinuous time intervals shown in FIG. 2a to FIG. 2e. The terminal device measures the to-be-measured cell in the measurement gap. The measurement gap periodically appears, and the terminal device may transmit data between two consecutive measurement gaps.

S302: The network device sends the plurality of pieces of measurement configuration information to the terminal device, and the terminal device receives the plurality of pieces of measurement configuration information sent by the network device.

The terminal device stores the plurality of pieces of received measurement configuration information. The terminal device receives the plurality of pieces of measurement configuration information sent by the network device. The plurality of pieces of measurement configuration information may be sent by one network device, or may be sent by a plurality of network devices. When the plurality of pieces of measurement configuration information is sent by one network device, the network device may be a serving base station of the terminal device, or may be a neighboring base station of the terminal device.

S303: The terminal device selects measurement configuration information from the plurality of pieces of measurement configuration information, and measures a to-be-measured cell in a measurement gap based on the selected measurement configuration information.

The terminal device selects the measurement configuration information from the plurality of pieces of measurement configuration information based on attribute information of the to-be-measured cell, and measures the to-be-measured cell based on the selected measurement configuration information. The to-be-measured cell may be a neighboring cell of the terminal device. The attribute information of the to-be-measured cell includes one or more of a frequency and a cell identifier.

For example, a period of the measurement gap in an LTE communications system is static 40 ms or 80 ms, and may be increased or decreased based on a period of a synchronization signal burst set (SS burst set) in an NR communications system. If the period of the synchronization signal burst set in the NR communications system is shorter than the period of the measurement gap in the LTE communications system, measurement may become faster. If the period of the synchronization signal burst set in the NR communications system is greater than the period of the measurement gap in the LTE communications system, an unwanted gap in which no synchronization signal burst set exists may be eliminated, to reduce measurement gap interruption. In a scenario in which an LTE cell and an NR cell are in dual connectivity, different pieces of measurement configuration information may be configured for the LTE cell and the NR cell respectively.

Optionally, in the scenario in which the LTE cell and the NR cell are in dual connectivity or multi-connectivity, the network device may configure two or more pieces of measurement configuration information for at least two cells, to improve measurement flexibility and efficiency. For example, different pieces of measurement configuration information are configured for the cells.

Optionally, in the scenario in which the LTE cell and the NR cell are in dual connectivity or multi-connectivity, the network device may configure a period of a measurement gap in the LTE cell to be equal to a period of a synchronization signal in the NR cell.

Optionally, the plurality of pieces of measurement configuration information are a plurality of pieces of specified frequency measurement configuration information; and the selecting, by the terminal device, measurement configuration information from the plurality of pieces of measurement configuration information includes:

obtaining, by the terminal device, a frequency of the to-be-measured cell; and selecting, by the terminal device, the measurement configuration information associated with the frequency of the to-be-measured cell from the plurality of pieces of measurement configuration information.

For example, the terminal device receives measurement configuration information 1, measurement configuration information 2, and measurement configuration information 3 that are sent by the network device, where the measurement configuration information 1 is associated with a frequency 1, the measurement configuration information 2 is associated with a frequency 2, and the measurement configuration information 3 is associated with a frequency 3. The terminal device learns that the frequency of the to-be-measured cell is the frequency 1, determines that the frequency 1 is associated with the measurement configuration information 1, and measures the to-be-measured cell based on the measurement configuration information 1.

Optionally, the plurality of pieces of measurement configuration information are a plurality of pieces of specified cell measurement configuration information; and the selecting, by the terminal device, measurement configuration information from the plurality of pieces of measurement configuration information includes:

obtaining, by the terminal device, an identifier of the to-be-measured cell; and selecting, by the terminal device, the measurement configuration information associated with the identifier of the to-be-measured cell from the plurality of pieces of measurement configuration information.

For example, the terminal device receives measurement configuration information 1, measurement configuration information 2, and measurement configuration information 3 that are sent by the network device, where the measurement configuration information 1 is associated with a cell identifier 1, the measurement configuration information 2 is associated with a cell identifier 2, and the measurement configuration information 3 is associated with a cell identifier 3. The terminal device learns that the identifier of the to-be-measured cell is the cell identifier 1, determines that the cell identifier 1 is associated with the measurement configuration information 1, and measures the to-be-measured cell based on the measurement configuration information 1.

Optionally, when there are a plurality of to-be-measured cells, the terminal device measures the plurality of cells in a measurement order indicated by the network device.

For example, the to-be-measured cells are a cell 1, a cell 2, and a cell 3. The terminal device sequentially measures the cell 3, the cell 2, and the cell 1 in the measurement order indicated by the network device.

In a possible implementation, the measurement method includes:

receiving, by the terminal device, an indication message sent by the network device;

determining, by the terminal device, measurement configuration information in a plurality of pieces of prestored measurement configuration information according to the indication message; and measuring, by the terminal device, a to-be-measured cell in a measurement gap based on the determined measurement configuration information.

Specifically, the terminal device prestores the plurality of pieces of measurement configuration information sent by the network device, the terminal device determines at least one piece of measurement configuration information in the plurality of pieces of measurement configuration information according to the indication message of the network device, and measures at least one to-be-measured cell based on the determined measurement configuration information. There may be one or more to-be-measured cells, and there may be one or more pieces of determined measurement configuration information. The cells may be measured by using different pieces of measurement configuration information, or the plurality of cells may be measured by using a same piece of measurement configuration information. Optionally, the measurement configuration information includes a length and/or a period of the measurement gap.

For example, the to-be-measured cell is a cell 1, and the terminal device prestores measurement configuration information 1, measurement configuration information 2, and measurement configuration information 3. The terminal device receives an indication message sent by the network device, and the indication message is used to instruct the terminal device to measure the cell 1 by using the measurement configuration information 2, and the terminal device measures a cell 2 in a measurement gap based on the measurement configuration information 2.

For another example, the to-be-measured cells are a cell 1 and a cell 2, and the terminal device prestores measurement configuration information 1, measurement configuration information 2, and measurement configuration information 3. The terminal device receives an indication message sent by the network device, and the indication message is used to instruct the terminal device to measure the cell 1 by using the measurement configuration information 1, and instruct the terminal device to measure the cell 2 by using the measurement configuration information 2.

Optionally, when there are a plurality of to-be-measured cells, the plurality of cells are neighboring cells of the terminal device, and the terminal device measures the plurality of cells in a measurement order indicated by the indication message.

For example, the neighboring cells of the terminal device are a cell 1, a cell 2, and a cell 3. The terminal device sequentially measures the cell 2, the cell 1, and the cell 3 based on the measurement configuration information in the measurement order indicated by the indication message sent by the network device.

The terminal device may select appropriate measurement configuration information from the plurality of pieces of measurement configuration information based on a related attribute of the to-be-measured cell, and measure the to-be-measured cell based on the appropriate measurement configuration information. This avoids a case in which a same piece of measurement configuration information is used for measurement in an entire communications system, thereby adapting to different application scenarios, such as a dual connectivity or multi-connectivity application scenario, and improving measurement flexibility.

It should be noted that the measurement rule indicated by the measurement configuration information in FIG. 2a to FIG. 2e may be applied to the measurement method shown in FIG. 3, to be specific, the terminal device in FIG. 3 may discontinuously perform measurement in the measurement gap according to the measurement rule in FIG. 2a to FIG. 2e.

The method in the embodiments of the present invention is described above in detail, and apparatuses in embodiments of the present invention are provided below.

Figure 4:
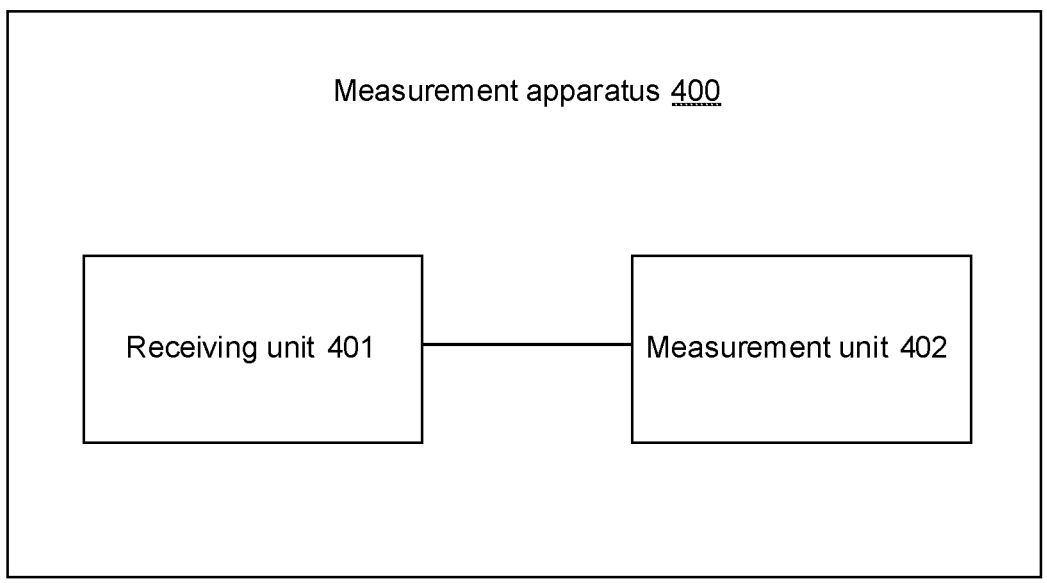
FIG. 4 is a schematic structural diagram of a measurement apparatus according to an embodiment of the present invention.

FIG. 4 is a schematic structural diagram of a measurement apparatus 400 according to an embodiment of the present invention. The measurement apparatus may be applied to the system shown in FIG. 1a. The measurement apparatus 400 may include a receiving unit 401 and a measurement unit 402.

It should be noted that the measurement apparatus 400 shown in FIG. 4 may implement a terminal device side in the embodiment shown in FIGS. 2a-2e. The receiving unit 401 is configured to receive measurement configuration information. For example, the receiving unit 401 performs step S202 in FIG. 2a. The measurement unit 402 is configured to measure, in m measurement windows in a measurement gap based on the measurement configuration information, m groups of to-be-measured signals sent by a network device, where m is an integer greater than 1. For example, the measurement unit 402 performs step S204 in FIG. 2a. The measurement apparatus 400 may be a terminal device. Alternatively, the measurement apparatus 400 may be a field-programmable gate array (FPGA), a dedicated integrated chip, a system on chip (SoC), a central processing unit (CPU), a network processor (NP), a digital signal processing circuit, or a micro controller unit (MCU) that implements a related function; or may be a programmable logic device (PLD) or another integrated chip.

For a specific parameter included in the measurement configuration information in this embodiment, the descriptions in the embodiments shown in FIG. 2a to FIG. 2e may be referred to.

This embodiment of the present invention and the method embodiments in FIG. 2a to FIG. 2e are based on a same concept, and technical effects brought by this embodiment of the present invention and the method embodiments in FIG. 2a to FIG. 2e are also the same. For a specific process, the descriptions of the method embodiments in FIG. 2a to FIG. 2e may be referred to.

Figure 5:
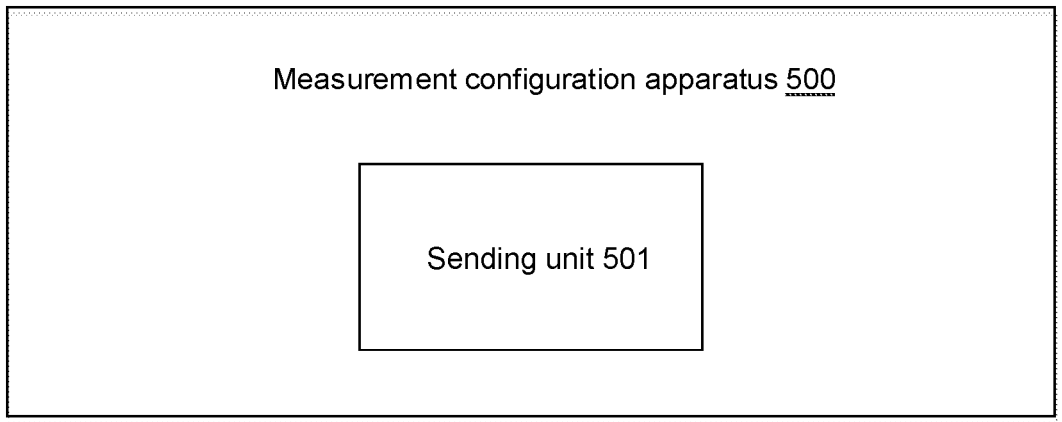
FIG. 5 is a schematic structural diagram of a measurement configuration apparatus according to an embodiment of the present invention.

FIG. 5 is a schematic structural diagram of a measurement configuration apparatus 500 according to an embodiment of the present invention. The measurement configuration apparatus 500 may include a sending unit 501.

It should be noted that the measurement configuration apparatus 500 shown in FIG. 5 may implement a network device side in the embodiment shown in FIG. 2a. The sending unit 501 is configured to: send measurement configuration information to a terminal device, and send m groups of to-be-measured signals to the terminal device in m measurement windows in a measurement gap based on the measurement configuration information, where m is an integer greater than 1. For example, the sending unit 501 is configured to perform steps S202 and S203 in FIG. 2a. The measurement configuration apparatus 500 may be a base station. Alternatively, the measurement configuration apparatus 500 may be a FPGA, a dedicated integrated chip, a SoC, a CPU, a NP, a digital signal processing circuit, or a MCU that implements a related function; or may be a PLD or another integrated chip.

Optionally, the measurement configuration apparatus 500 further includes an adjustment unit (not shown).

The adjustment unit is configured to adjust lengths of the m measurement windows based on a service delay requirement.

For a specific parameter included in the measurement configuration information in this embodiment, the descriptions in the embodiments shown in FIG. 2a to FIG. 2e may be referred to.

This embodiment of the present invention and the method embodiments in FIG. 2a to FIG. 2e are based on a same concept, and technical effects brought by this embodiment of the present invention and the method embodiments in FIG. 2a to FIG. 2e are also the same. For a specific process, the descriptions in the method embodiments in FIG. 2a to FIG. 2e may be referred to.

Figure 6:
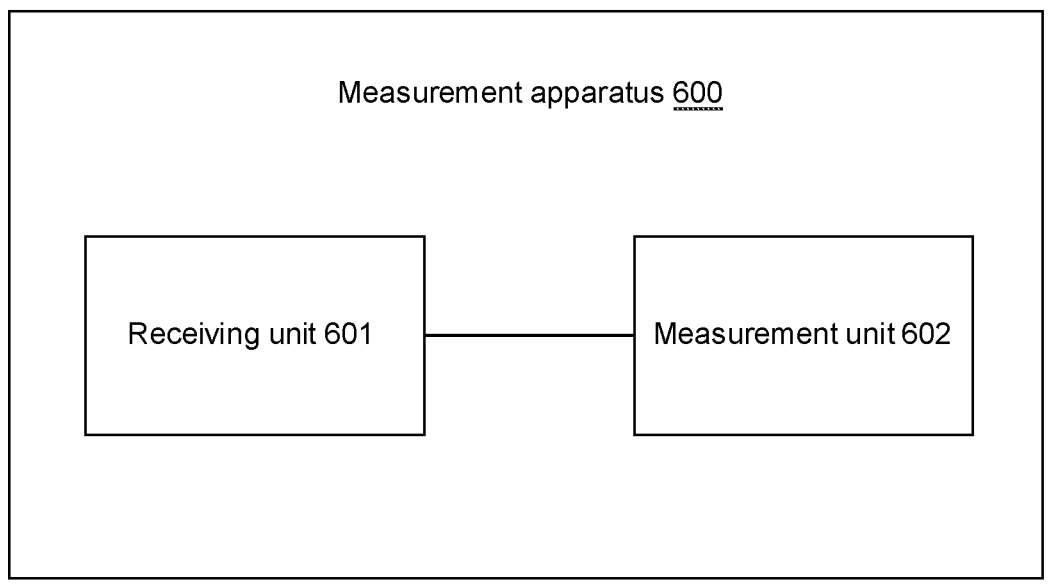
FIG. 6 is a schematic structural diagram of still another measurement configuration apparatus according to an embodiment of the present invention.

It should be noted that a measurement apparatus 600 shown in FIG. 6 may implement a terminal device side in the embodiment shown in FIG. 3. The receiving unit 601 is configured to receive a plurality of pieces of measurement configuration information. For example, the receiving unit 601 performs step S302 in FIG. 3. The measurement unit 602 is configured to: select measurement configuration information from the plurality of pieces of measurement configuration information, and measure a to-be-measured cell in a measurement gap based on the selected measurement configuration information. For example, the measurement unit 602 performs step S303 in FIG. 3. The measurement apparatus 600 may be a terminal device. Alternatively, the measurement apparatus 600 may be a FPGA, a dedicated integrated chip, a SoC, a CPU, a NP, a digital signal processing circuit, or a MCU that implements a related function; or may be a PLD or another integrated chip.

Optionally, the plurality of pieces of measurement configuration information are a plurality of pieces of specified frequency measurement configuration information or a plurality of pieces of specified cell measurement configuration information.

The measurement unit 602 is configured to:

obtain a frequency of the to-be-measured cell; and select the measurement configuration information associated with the frequency of the to-be-measured cell from the plurality of pieces of measurement configuration information; or obtain an identifier of the to-be-measured cell; and select the measurement configuration information associated with the identifier of the to-be-measured cell from the plurality of pieces of measurement configuration information.

Optionally, the measurement configuration information includes: a length of the measurement gap and/or a period of the measurement gap.

For a parameter included in the measurement configuration information in this embodiment, the descriptions in the embodiments shown in FIG. 2a to FIG. 2e may be referred to.

This embodiment of the present invention and the method embodiment in FIG. 3 are based on a same concept, and technical effects brought by this embodiment of the present invention and the method embodiment in FIG. 3 are also the same. For a specific process, the descriptions in the method embodiment in FIG. 3 may be referred to.

Figure 7:
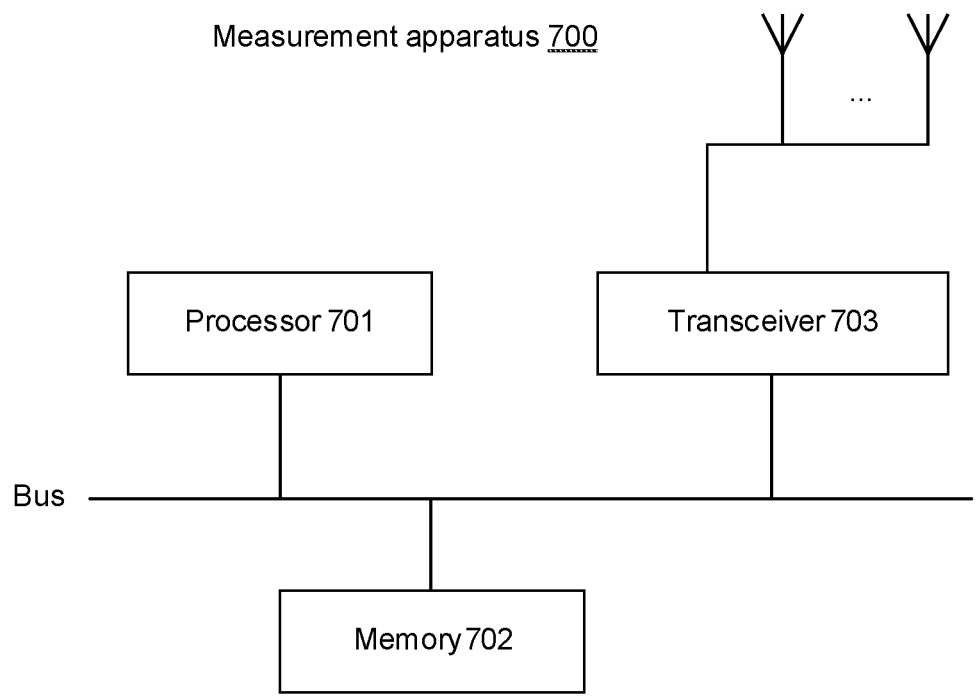
FIG. 7 is a schematic structural diagram of still another measurement apparatus according to an embodiment of the present invention.

As shown in FIG. 7, an embodiment of the present invention further provides a measurement apparatus 700.

In a possible design, the measurement apparatus 700 is a terminal device, and the terminal device includes a processor 701, a memory 702, and a transceiver 703.

The memory 702 is configured to store a program and data. There may be one or more memories, and a type of the memory may be any form of storage medium. For example, the memory may be a random access memory (RAM), a read-only memory (ROM), or a flash memory. The memory 702 may be located in the terminal device alone, or may be located in the processor 701.

The transceiver 703 is configured to send and receive a signal. The transceiver may be used as an independent chip, or may be a transceiver circuit in the processor 701, or may be used as an input/output interface. The transceiver may include at least one of a transmitter or a receiver. The transmitter is configured to perform the sending step in the foregoing method embodiment, and the receiver is configured to perform the receiving step in the foregoing method embodiment. Optionally, the transceiver 703 may further include a transmit antenna and a receive antenna. The transmit antenna and the receive antenna may be two separately disposed antennas, or may be one antenna. The transceiver 703 is configured to receive measurement configuration information. For example, the transceiver 703 is configured to perform S202 in FIG. 2*a*.

The processor 701 is configured to execute the program stored in the memory 702, and when the program code is executed, the processor 701 is configured to measure, in m measurement windows in a measurement gap based on the measurement configuration information, m groups of to-be-measured signals sent by a network device, where m is an integer greater than 1. For example, the processor 701 is configured to perform step S204 in FIG. 2*a*.

The transceiver 703, the memory 702, and the processor 701 communicate with each other by using an internal connection path, for example, a bus.

For a specific parameter included in the measurement configuration information, the descriptions in the embodiments in FIG. 2*a* to FIG. 2*e* may be referred to.

In a possible design, the measurement apparatus 700 may be a chip, for example, a communications chip used in the terminal device, and is configured to implement a related function of the processor 701 in the terminal device. The chip may be a field-programmable gate array, a dedicated integrated chip, a system on chip, a central processing unit, a network processor, a digital signal processing circuit, or a micro controller unit that implements a related function; or may be a programmable logic device or another integrated chip. Optionally, the chip may include one or more memories, configured to store program code. When the program code is executed, the processor is enabled to implement a corresponding function.

All or some of the chips may be implemented by using software, hardware, firmware, or any combination thereof. When a software program is used to implement the chips, the chips may be implemented completely or partially in a form of a computer program product. The computer program product includes one or more computer program instructions (also referred to as code or programs sometimes). When the computer program instructions are loaded and executed on a computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

This embodiment of the present invention and the method embodiments in FIG. 2*a* to FIG. 2*e* are based on a same concept, and technical effects brought by this embodiment of the present invention and the method embodiments in FIG. 2*a* to FIG. 2*e* are also the same. For a specific process, the descriptions in the method embodiments in FIG. 2*a* to FIG. 2*e* may be referred to.

Figure 8:
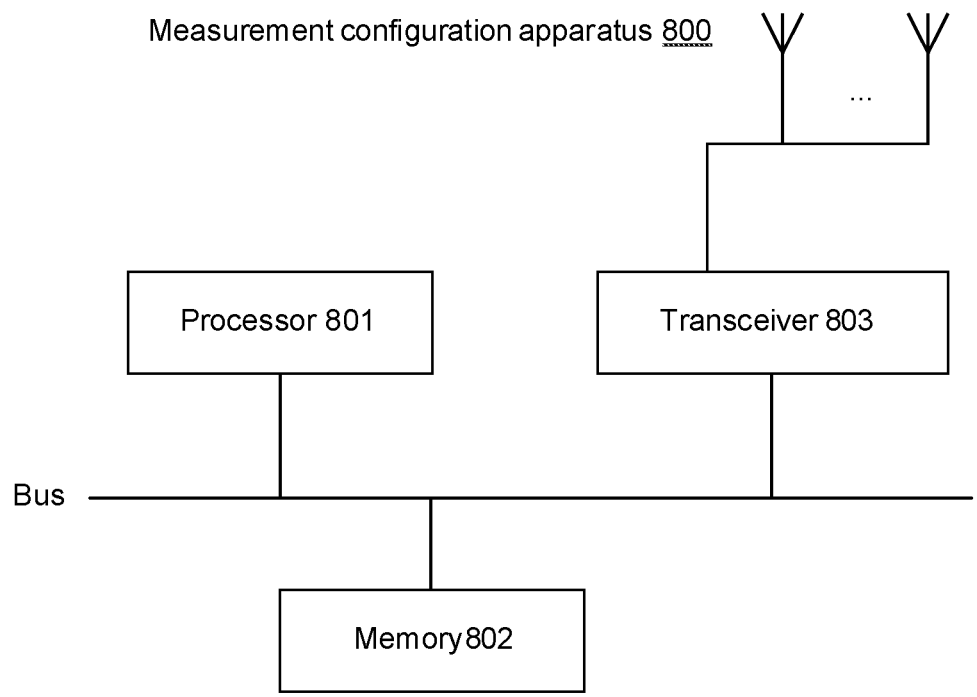
FIG. 8 is a schematic structural diagram of still another measurement configuration apparatus according to an embodiment of the present invention.

As shown in FIG. 8, an embodiment of the present invention further provides a measurement configuration apparatus 800.

In a possible design, the measurement configuration apparatus 800 is a network device, and the network device includes a processor 801, a memory 802, and a transceiver 803.

The memory 802 is configured to store a program and data. There may be one or more memories, and a type of the memory may be any form of storage medium. For example, the memory may be a RAM, a ROM, or a flash memory. The memory 802 may be located in the network device alone, or may be located in the processor 801.

The transceiver 803 is configured to send and receive a signal. The transceiver may be used as an independent chip, or may be a transceiver circuit in the processor 801, or may be used as an input/output interface. The transceiver may include at least one of a transmitter or a receiver. The transmitter is configured to perform the sending step in the foregoing method embodiment, and the receiver is configured to perform the receiving step in the foregoing method embodiment. Optionally, the transceiver 803 may further include a transmit antenna and a receive antenna. The transmit antenna and the receive antenna may be two separately disposed antennas, or may be one antenna. The transceiver 803 is configured to: send measurement configuration information to a terminal device, and send, in m measurement windows in a measurement gap based on the measurement configuration information, m groups of to-be-measured signals to the terminal device, where m is an integer greater than 1. For example, the transceiver 803 is configured to perform S202 and S203 in FIG. 2*a*.

The processor 801 is configured to execute the program stored in the memory 802, and perform steps indicated by the program code.

The processor 801 may be configured to adjust lengths of the m measurement windows based on a service delay requirement.

The transceiver 803, the memory 802, and the processor 801 communicate with each other by using an internal connection path, for example, a bus.

For a specific parameter included in the measurement configuration information in this embodiment, the descriptions in the embodiments in FIG. 2*a* to FIG. 2*e* may be referred to.

Optionally, a system message that carries the measurement configuration information includes at least one of a MIB, a SIB, MSI, or RMSI; and the RRC message includes any one of a RRC connection reconfiguration message, a RRC connection reestablishment message, a RRC connection setup message, and an RRC connection resume message.

In a possible design, the measurement configuration apparatus 800 may be a chip, for example, a communications chip used in the network device, and is configured to implement a related function of the processor 801 in the network device. The chip may be a field-programmable gate array, a dedicated integrated chip, a system on chip, a central processing unit, a network processor, a digital signal processing circuit, or a micro controller unit that implements a related function; or may be a programmable logic device or another integrated chip. Optionally, the chip may include one or more memories, configured to store program code.

When the program code is executed, the processor is enabled to implement a corresponding function.

All or some of the chips may be implemented by using software, hardware, firmware, or any combination thereof. When a software program is used to implement the chips, the chips may be implemented completely or partially in a form of a computer program product. The computer program product includes one or more computer program instructions (also referred to as code or programs sometimes). When the computer program instructions are loaded and executed on a computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a SSD), or the like.

This embodiment of the present invention and the method embodiments in FIG. 2a to FIG. 2e are based on a same concept, and technical effects brought by this embodiment of the present invention and the method embodiments in FIG. 2a to FIG. 2e are also the same. For a specific process, the descriptions in the method embodiments in FIG. 2a to FIG. 2e may be referred to.

As shown in FIG. 9, an embodiment of the present invention further provides a measurement apparatus 900.

In a possible design, the measurement apparatus 900 is a terminal device, and the terminal device includes a processor 901, a memory 902, and a transceiver 903.

The memory 902 is configured to store a program and data. There may be one or more memories, and a type of the memory may be any form of storage medium.

For example, the memory may be a RAM, a ROM, or a flash memory. The memory 902 may be located in the terminal device alone, or may be located in the processor 901.

The transceiver 903 is configured to send and receive a signal. The transceiver may be used as an independent chip, or may be a transceiver circuit in the processor 901, or may be used as an input/output interface. The transceiver may include at least one of a transmitter or a receiver. The transmitter is configured to perform the sending step in the foregoing method embodiment, and the receiver is configured to perform the receiving step in the foregoing method embodiment. Optionally, the transceiver 903 may further include a transmit antenna and a receive antenna. The transmit antenna and the receive antenna may be two separately disposed antennas, or may be one antenna. The transceiver 903 is configured to receive a plurality of pieces of measurement configuration information. For example, the transceiver 903 is configured to perform S302 in FIG. 3.

The processor 901 is configured to execute the program stored in the memory 902, and when the program code is executed, the processor 901 is configured to: select measurement configuration information from the plurality of pieces of measurement configuration information, and measure a to-be-measured cell in a measurement gap based on the selected measurement configuration information. For example, the processor 901 is configured to perform S303 in FIG. 3.

The transceiver 903, the memory 902, and the processor 901 communicate with each other by using an internal connection path, for example, a bus.

Optionally, the plurality of pieces of measurement configuration information are a plurality of pieces of specified frequency measurement configuration information; and
the processor 901 may be configured to:
obtain a frequency of the to-be-measured cell; and
select the measurement configuration information associated with the frequency of the to-be-measured cell from the plurality of pieces of measurement configuration information.

Optionally, the plurality of pieces of measurement configuration information are a plurality of pieces of specified cell measurement configuration information; and
the processor 901 may be configured to:
obtain an identifier of the to-be-measured cell; and
select the measurement configuration information associated with the identifier of the to-be-measured cell from the plurality of pieces of measurement configuration information.

Optionally, the measurement configuration information includes: a length of the measurement gap and a period of the measurement gap.

In a possible implementation, the measurement apparatus 900 may be a chip, for example, a communications chip used in the terminal device, and is configured to implement a related function of the processor 901 in the terminal device. The chip may be a field-programmable gate array, a dedicated integrated chip, a system on chip, a central processing unit, a network processor, a digital signal processing circuit, or a micro controller unit that implements a related function; or may be a programmable logic device or another integrated chip. Optionally, the chip may include one or more memories, configured to store program code. When the program code is executed, the processor is enabled to implement a corresponding function.

All or some of the chips may be implemented by using software, hardware, firmware, or any combination thereof. When a software program is used to implement the chips, the chips may be implemented completely or partially in a form of a computer program product. The computer program product includes one or more computer program instructions (also referred to as code or programs sometimes). When the computer program instructions are loaded and executed on a computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a SSD), or the like.

This embodiment of the present invention and the method embodiment in FIG. 3 are based on a same concept, and technical effects brought by this embodiment of the present invention and the method embodiment in FIG. 3 are also the same. For a specific process, the descriptions in the method embodiment in FIG. 3 may be referred to.

FIG. 10a is another schematic flowchart of a measurement method according to an embodiment of the present invention. In this embodiment of the present invention, the method includes the following steps.

S1001: A terminal device receives at least one of a period, a time offset, or a number of a synchronization signal burst set in a to-be-measured cell that are sent by a network device.

The terminal device camps on a cell of the network device, and the cell is a serving cell. The network device obtains a period of a synchronization signal burst set in the serving cell, and obtains a period of a synchronization signal burst set in a neighboring cell by interacting with a neighboring base station; and the network device determines, by using a location at which the synchronization signal burst set appears in the serving cell and a location at which the synchronization signal burst set appears in the neighboring cell, a location offset, namely, a time offset, between the two synchronization signal burst sets having a same group number and a same number in groups having the same group number in the serving cell and the neighboring cell.

The to-be-measured cell may be the neighboring cell of the serving cell of the terminal device, and the number is the number of the SS burst set. A synchronization signal burst set periodically appears. A plurality of synchronization signal burst sets are grouped into one group, the synchronization signal burst sets in the group have numbers, and the group may be a physical broadcast channel (PBCH). For example, the synchronization signal burst sets in the group are numbered from 1. The time offset is a location offset between a synchronization signal burst set indicated by the number in the serving cell and the synchronization signal burst set indicated by the number in the to-be-measured cell.

Figure 10B:
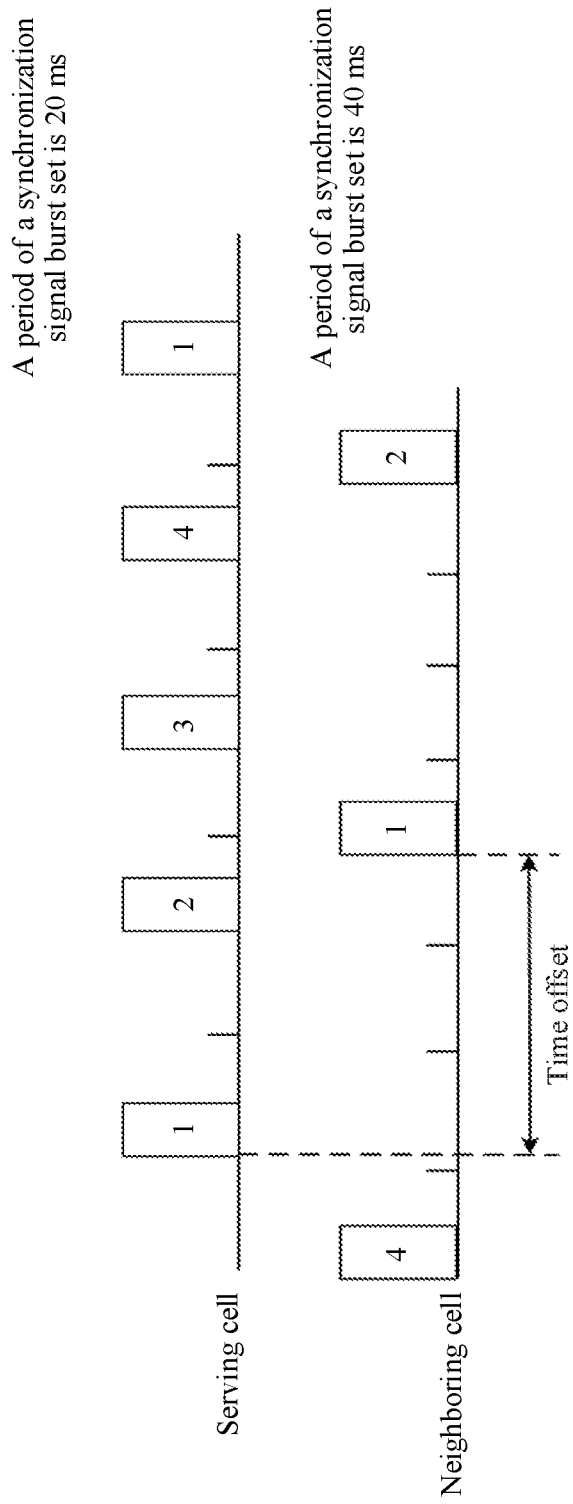
FIG. 10b is a sequence diagram of a synchronization signal burst set according to an embodiment of the present invention.

For example, referring to FIG. 10b, a period of a synchronization signal burst set in a serving cell is 20 ms, and in the serving cell and a neighboring cell, one group includes four synchronization signal burst sets, which are respectively a synchronization signal burst set 1, a synchronization signal burst set 2, a synchronization signal burst set 3, and a synchronization signal burst set 4. The offset is a location offset between the synchronization signal burst set 1 in the serving cell and the synchronization signal burst set 1 in the neighboring cell.

Optionally, the number is at least one of a subframe number, a system frame number, or a slot number. The subframe number indicates a number of a subframe in which the synchronization signal burst set is located, the system frame number indicates a number of a system frame in which the synchronization signal burst set is located, and the slot number indicates a number of a slot in which the synchronization signal burst set is located.

S1002: The terminal device determines a location of the synchronization signal burst set in the to-be-measured cell based on a period of the synchronization signal burst set in the serving cell, the period of the synchronization signal burst set in the to-be-measured cell, and the time offset.

For example, referring to FIG. 10b, the terminal device determines a location of the synchronization signal burst set 1 in the neighboring cell based on a location of the synchronization signal burst set 1 in the serving cell and the corresponding time offset; and then the terminal device determines a location of a subsequent synchronization signal burst set based on the location of the synchronization signal burst set 1 in the neighboring cell and a period of the synchronization signal burst set in the neighboring cell.

S1003: The terminal device measures the to-be-measured cell based on the location of the synchronization signal burst set in the to-be-measured cell.

The terminal device receives, in each synchronization signal burst set, a synchronization signal sent by the network device, and reports a measurement result to the network device.

It should be noted that the measurement rule indicated by the measurement configuration information in FIG. 2a to FIG. 2e may be applied to the measurement method shown in FIG. 10a, to be specific, the terminal device in FIG. 10a may discontinuously perform measurement in a measurement gap according to the measurement rule in FIG. 2a to FIG. 2e.

During implementation of the foregoing embodiment, the terminal device can determine a location of the synchronization signal in the neighboring cell based on the time offset notified by the network device. In this way, the terminal device can quickly measure the neighboring cell based on the location of the synchronization signal.

Figure 11:
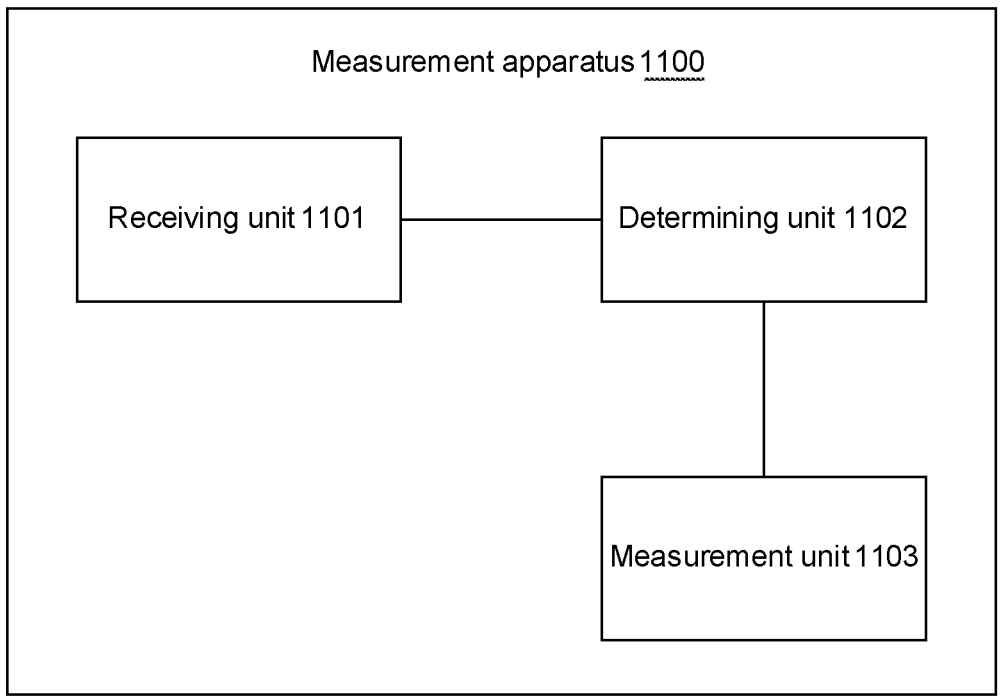
FIG. 11 is a schematic structural diagram of still another measurement apparatus according to an embodiment of the present invention.

It should be noted that a measurement apparatus 1100 shown in FIG. 11 may implement a terminal device side in the embodiment shown in FIG. 10a. A receiving unit 1101 is configured to receive a period, a time offset, and a number of a synchronization signal burst set in a to-be-measured cell that are sent by a network device. The time offset is a location offset between a synchronization signal burst set indicated by the number in a serving cell and the synchronization signal burst set indicated by the number in the to-be-measured cell. For example, the receiving unit 1101 performs step S1001 in FIG. 10a. A determining unit 1102 is configured to determine a location of the synchronization signal burst set in the to-be-measured cell based on a period of the synchronization signal burst set in the serving cell, the period of the synchronization signal burst set in the to-be-measured cell, and the time offset. For example, the determining unit 1102 performs step S1002 in FIG. 10a. A measurement unit 1103 is configured to measure the to-be-measured cell based on the location of the synchronization signal burst set in the to-be-measured cell. For example, the measurement unit 1103 is configured to perform step S1003 in FIG. 10a. The measurement apparatus 1100 may be a terminal device. Alternatively, the measurement apparatus 1100 may be a FPGA, a dedicated integrated chip, a SoC, a CPU, a NP, a digital signal processing circuit, or a MCU that implements a related function; or may be a PLD or another integrated chip.

This embodiment of the present invention and the method embodiment in FIG. 10a are based on a same concept, and technical effects brought by this embodiment of the present invention and the method embodiment in FIG. 10a are also the same. For a specific process, the descriptions of the method embodiment in FIG. 10a may be referred to.

Figure 12:
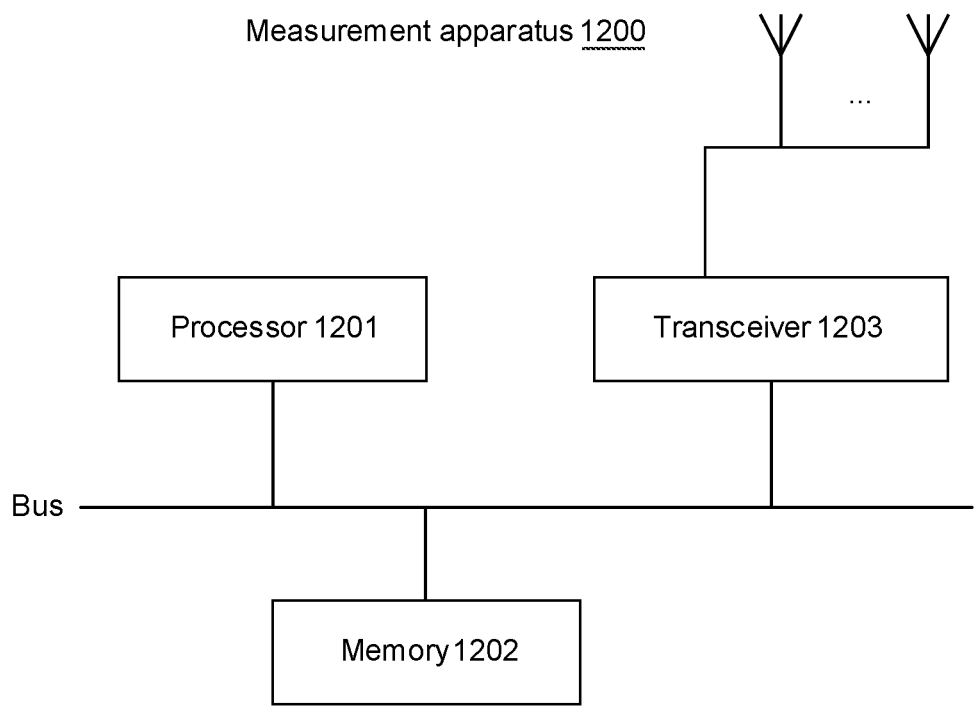
FIG. 12 is a schematic structural diagram of still another measurement apparatus according to an embodiment of the present invention.

As shown in FIG. 12, an embodiment of the present invention further provides a measurement apparatus 1200.

In a possible design, the measurement apparatus 1200 is a terminal device, and the terminal device includes a processor 1201, a memory 1202, and a transceiver 1203.

The memory 1202 is configured to store a program and data. There may be one or more memories, and a type of the memory may be any form of storage medium. For example, the memory may be a RAM, a ROM, or a flash memory. The memory 1202 may be located in the terminal device alone, or may be located in the processor 1201.

The transceiver 1203 is configured to send and receive a signal. The transceiver may be used as an independent chip, or may be a transceiver circuit in the processor 1201, or may be used as an input/output interface. The transceiver may be at least one of a transmitter or a receiver. The transmitter is configured to perform a sending step in the apparatus, and the receiver is configured to perform a receiving step in the apparatus. Optionally, the transceiver 1203 may further include a transmit antenna and a receive antenna. The transmit antenna and the receive antenna may be two separately disposed antennas, or may be one antenna. The transceiver 1203 is configured to receive at least one of a period, a time offset, or a number of a synchronization signal burst set in a to-be-measured cell that are sent by a network device. The time offset is a location offset between a synchronization signal burst set indicated by the number in a serving cell and the synchronization signal burst set indicated by the number in the to-be-measured cell. For example, the transceiver 1203 is configured to perform S1001 in FIG. 10*a*.

The processor 1201 is configured to execute the program stored in the memory 1202, and when the program code is executed, the processor 1201 is configured to: determine a location of the synchronization signal burst set in the to-be-measured cell based on a period of the synchronization signal burst set in the serving cell, the period of the synchronization signal burst set in the to-be-measured cell, and the time offset; and measure the to-be-measured cell based on the location of the synchronization signal burst set in the to-be-measured cell. For example, the processor 1201 is configured to perform steps S1002 and S1003 in FIG. 10*a*.

The transceiver 1203, the memory 1202, and the processor 1201 communicate with each other by using an internal connection path, for example, a bus.

Optionally, the number is a subframe number and/or a system frame number.

Optionally, that the transceiver 1203 receives the at least one of the period, the time offset, or the number of the synchronization signal burst set in the to-be-measured cell that are sent by the network device includes:

receiving RRC signaling that is sent by the network device and that carries the at least one of the period, the time offset, or the number of the synchronization signal burst set in the to-be-measured cell.

In a possible design, the measurement apparatus 1200 may be a chip, for example, a communications chip used in the terminal device, and is configured to implement a related function of the processor 1201 in the terminal device. The chip may be a field-programmable gate array, a dedicated integrated chip, a system on chip, a central processing unit, a network processor, a digital signal processing circuit, or a micro controller unit that implements a related function; or may be a programmable logic device or another integrated chip. Optionally, the chip may include one or more memories, configured to store program code. When the program code is executed, the processor is enabled to implement a corresponding function.

All or some of the chips may be implemented by using software, hardware, firmware, or any combination thereof. When a software program is used to implement the chips, the chips may be implemented completely or partially in a form of a computer program product. The computer program product includes one or more computer program instructions (also referred to as code or programs sometimes). When the computer program instructions are loaded and executed on a computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a SSD), or the like.

This embodiment of the present invention and the method embodiment in FIG. 10*a* are based on a same concept, and technical effects brought by this embodiment of the present invention and the method embodiment in FIG. 10*a* are also the same. For a specific process, refer to the descriptions of the method embodiment in FIG. 10*a*. Details are not described herein again.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by using hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present invention are all or partially generated. The computer may be a general-purpose computer, a special-purpose computer, a computer network, or other programmable apparatuses. The computer instruction may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a SSD), or the like.

A person of ordinary skill in the art may understand that all or some of the processes of the methods in the embodiments may be implemented by a computer program instructing relevant hardware. The program may be stored in a computer-readable storage medium. When the program is executed, the processes of the methods in the embodiments are performed. The foregoing storage medium includes: any medium that can store program code, such as a ROM, a RAM, a magnetic disk, or an optical disc.

What is claimed is:

1. A measurement method, comprising:
   receiving, by a terminal device, a period of a synchronization signal burst set in a to-be-measured cell, a time offset of the synchronization signal burst set, and a number identifying the synchronization signal burst set in the to-be-measured cell, wherein the period, the time offset, and the number are sent by a network device, and wherein the time offset is a location offset between a synchronization signal burst set identified by the number in a serving cell and the synchronization signal burst set identified by the number in the to-be-measured cell; and
   determining, by the terminal device when the period and the time offset are received from the network device, a location of the synchronization signal burst set in the to-be-measured cell based on a period of the synchronization signal burst set in the serving cell, the period of the synchronization signal burst set in the to-be-measured cell, and the time offset; and
   measuring, by the terminal device, the to-be-measured cell based on the determined location of the synchronization signal burst set in the to-be-measured cell.

2. The method according to claim 1, wherein the number is a subframe number and/or a system frame number.

3. The method according to claim 1, wherein the receiving comprises:
   receiving, by the terminal device, a radio resource control (RRC) signaling that is sent by the network device and that carries at least one of the period, the time offset, and the number of the synchronization signal burst set in the to-be-measured cell.

4. A measurement apparatus, comprising a transceiver and a processor, wherein
   the transceiver is configured to receive a period of a synchronization signal burst set in a to-be-measured cell, a time offset of the synchronization signal burst set, and a number identifying the synchronization signal burst set in the to-be-measured cell, wherein the period, the time offset, and the number are sent by a network device, and wherein the time offset is a location offset between a synchronization signal burst set identified by the number in a serving cell and the synchronization signal burst set identified by the number in the to-be-measured cell; and
   the processor is configured to determine, when the period and the time offset are received from the network device, a location of the synchronization signal burst set in the to-be-measured cell based on a period of the synchronization signal burst set in the serving cell, the period of the synchronization signal burst set in the to-be-measured cell, and the time offset, and measure the to-be-measured cell based on the determined location of the synchronization signal burst set in the to-be-measured cell.

5. The apparatus according to claim 4, wherein the number is a subframe number and/or a system frame number.

6. The apparatus according to claim 4, wherein the transceiver is further configured to:
   receiving a radio resource control (RRC) signaling that is sent by the network device and that carries at least one of the period, the time offset, and the number of the synchronization signal burst set in the to-be-measured cell.

7. A non-transitory computer-readable storage medium, wherein the computer-readable storage medium stores one or more instructions, and when the one or more instructions are run on a computer of a terminal device, the terminal device is enabled to perform operations comprising:
   receiving a period of a synchronization signal burst set in a to-be-measured cell, a time offset of the synchronization signal burst set, and a number identifying the synchronization signal burst set in the to-be-measured cell, wherein the period, the time offset and the number are sent by a network device, and wherein the time offset is a location offset between a synchronization signal burst set identified by the number in a serving cell and the synchronization signal burst set identified by the number in the to-be-measured cell; and
   determining, when the period and the time offset are received from the network device, a location of the synchronization signal burst set in the to-be-measured cell based on a period of the synchronization signal burst set in the serving cell, the period of the synchronization signal burst set in the to-be-measured cell, and the time offset; and
   measuring the to-be-measured cell based on the determined location of the synchronization signal burst set in the to-be-measured cell.

8. The non-transitory computer-readable storage medium according to claim 7, wherein the number is a subframe number and/or a system frame number.

9. The non-transitory computer-readable storage medium according to claim 7, wherein the receiving comprises:
receiving a radio resource control (RRC) signaling that is sent by the network device and that carries at least one of the period, the time offset, and the number of the synchronization signal burst set in the to-be-measured cell.

10. The measurement method according to claim 1, wherein the period of a synchronization signal burst set in a to-be-measured cell corresponds to a time interval between a first synchronization signal burst set in the to-be-measured cell and a second synchronization signal burst set in the to-be-measured cell, wherein the first synchronization signal burst set is identified by the number and the second synchronization signal burst set is identified by the number, and wherein the second synchronization signal burst set follows the first synchronization signal burst set without any intervening synchronization signal burst sets identified by the number.

11. The measurement method according to claim 1, wherein a synchronization signal burst set group comprises a plurality of synchronization signal burst sets each identified by a respective index value, and wherein the number corresponds to one of the respective index values.

12. The measurement apparatus according to claim 5, wherein the period of a synchronization signal burst set in a to-be-measured cell corresponds to a time interval between a first synchronization signal burst set in the to-be-measured cell and a second synchronization signal burst set in the to-be-measured cell, wherein the first synchronization signal burst set is identified by the number and the second synchronization signal burst set is identified by the number, and wherein the second synchronization signal burst set follows the first synchronization signal burst set without any intervening synchronization signal burst sets identified by the number.

13. The measurement apparatus according to claim 12, wherein a synchronization signal burst set group comprises a plurality of synchronization signal burst sets each identified by a respective index value, and wherein the number corresponds to one of the respective index values.

14. The non-transitory computer-readable storage medium according to claim 7, wherein the period of a synchronization signal burst set in a to-be-measured cell corresponds to a time interval between a first synchronization signal burst set in the to-be-measured cell and a second synchronization signal burst set in the to-be-measured cell, wherein the first synchronization signal burst set is identified by the number and the second synchronization signal burst set is identified by the number, and wherein the second synchronization signal burst set follows the first synchronization signal burst set without any intervening synchronization signal burst sets identified by the number.

15. The non-transitory computer-readable storage medium according to claim 14, wherein a synchronization signal burst set group comprises a plurality of synchronization signal burst sets each identified by a respective index value, and wherein the number corresponds to one of the respective index values.

* * * * *